United States Patent
Kinoshita et al.

(10) Patent No.: US 10,768,608 B2
(45) Date of Patent: Sep. 8, 2020

(54) CONTROLLING DEVICE, CONTROLLED DEVICE, CONTROLLING METHOD, CONTROLLING SYSTEM, STORAGE MEDIUM, AND NOTIFICATION DEVICE

(71) Applicant: SHARP KABUSHIKI KAISHA, Osaka-shi, Osaka (JP)

(72) Inventors: Shinichiro Kinoshita, Osaka (JP); Junichi Shirakawa, Osaka (JP); Tetsuji Kimura, Osaka (JP); Shunsuke Yajima, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 622 days.

(21) Appl. No.: 14/497,403

(22) Filed: Sep. 26, 2014

(65) Prior Publication Data

US 2015/0094825 A1    Apr. 2, 2015

(30) Foreign Application Priority Data

Sep. 27, 2013  (JP) ................................. 2013-202481
Sep. 27, 2013  (JP) ................................. 2013-202485

(51) Int. Cl.
*G05B 19/418*  (2006.01)
*G05B 15/02*  (2006.01)
*H04L 12/28*  (2006.01)

(52) U.S. Cl.
CPC ........... *G05B 19/418* (2013.01); *G05B 15/02* (2013.01); *H04L 12/2825* (2013.01); *H04L 12/2827* (2013.01); *G05B 2219/21005* (2013.01); *G05B 2219/2642* (2013.01)

(58) Field of Classification Search
CPC .................. G05B 15/02; G05B 19/418; G05B 2219/2642; G05B 2219/21005

USPC ............................................................ 700/19
See application file for complete search history.

(56) References Cited

U.S. PATENT DOCUMENTS

| | | | | |
|---|---|---|---|---|
| 6,792,319 B1* | 9/2004 | Bilger | .................... | G05B 15/02 700/12 |
| 6,829,513 B2* | 12/2004 | Piersanti | ................ | G05B 15/02 340/12.53 |
| 6,909,921 B1* | 6/2005 | Bilger | .................... | G05B 15/02 700/14 |
| 2005/0159823 A1* | 7/2005 | Hayes | .................... | G05B 15/02 700/19 |
| 2006/0149395 A1* | 7/2006 | Archacki, Jr. | ......... | G05B 15/02 700/19 |

(Continued)

FOREIGN PATENT DOCUMENTS

| | | |
|---|---|---|
| CN | 102297491 A | 12/2011 |
| CN | 102383286 A | 3/2012 |

(Continued)

OTHER PUBLICATIONS

Kaliappan et al., "Flexible Power Consumption Management in Smart Homes", ACM, 7pg. (Year: 2012).*

*Primary Examiner* — Ryan D. Coyer

(74) *Attorney, Agent, or Firm* — Birch, Stewart, Kolasch & Birch, LLP

(57) ABSTRACT

A controlling device includes: controlling sections configured to control respective of a plurality of devices; and a master controlling section configured to determine, by referring to information obtained from one of the plurality of devices, a control matter concerning another one of the plurality of devices.

21 Claims, 21 Drawing Sheets

(56) References Cited

U.S. PATENT DOCUMENTS

| | | | |
|---|---|---|---|
| 2006/0161270 A1* | 7/2006 | Luskin | G05B 15/02 700/22 |
| 2010/0082174 A1* | 4/2010 | Weaver | H02J 3/14 700/295 |
| 2010/0289643 A1* | 11/2010 | Trundle | F24F 11/0086 340/545.1 |
| 2013/0073106 A1 | 3/2013 | Yamada et al. | |

FOREIGN PATENT DOCUMENTS

| | | |
|---|---|---|
| JP | 2002-281567 A | 9/2002 |
| JP | 2003-162626 A | 6/2003 |
| JP | 2003-196412 A | 7/2003 |
| JP | 2004-007297 A | 1/2004 |
| JP | 2004-102882 A | 4/2004 |
| JP | 2004-112073 A | 4/2004 |
| JP | 2006-235886 A | 9/2006 |
| JP | 2011-152043 A | 8/2011 |
| JP | 2013-077901 A | 4/2013 |
| JP | 2013-102281 A | 5/2013 |
| JP | 2013-162314 A | 8/2013 |
| WO | WO 2012/050208 A1 | 4/2012 |
| WO | WO 2012/118056 A1 | 9/2012 |

\* cited by examiner

FIG. 9
(a)
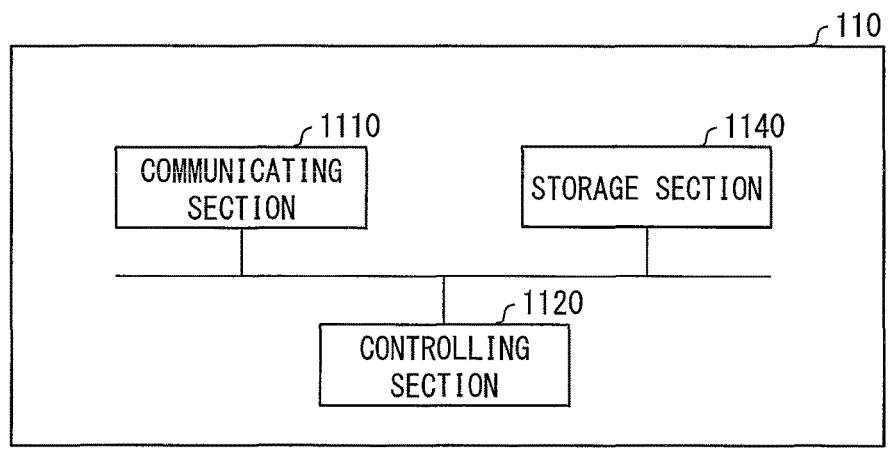
(b)
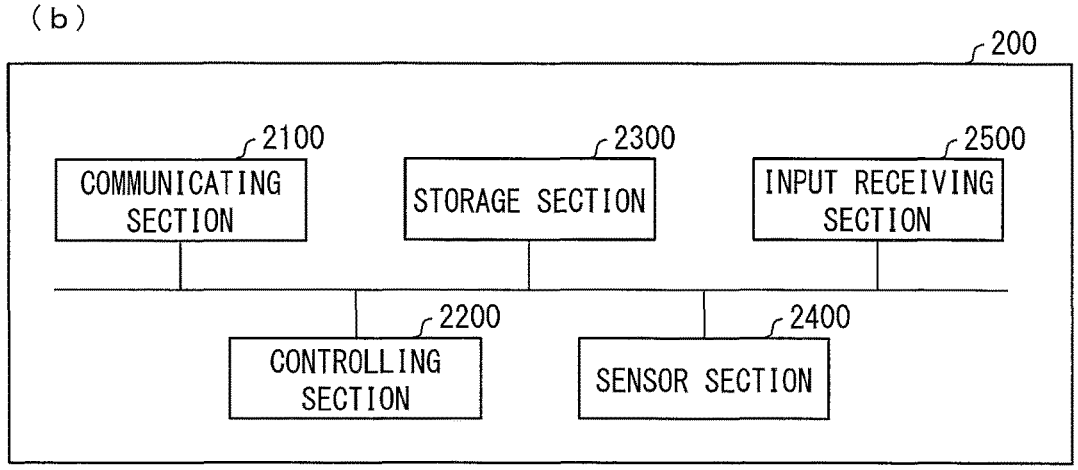

FIG. 13

| WEATHER FORECAST / OPERATION STATUS | FINE | RAINY |
|---|---|---|
| DRYER SET DURING WASHING CYCLE | — | SUGGEST USE OF DRYER |
| DRYER NOT SET DURING WASHING CYCLE | SUGGEST CANCELLATION OF USE OF DRYER | — |

| NOTIFICATION DEVICE | DISPLAY | SOUND | OTHER |
|---|---|---|---|
| CLEANING ROBOT | × | ○ | ○ |
| REFRIGERATOR | × | ○ | × |
| SMARTPHONE | ○ | ○ | ○ |
| TELEVISION | ○ | ○ | × |
| GAMING DEVICE | ○ | ○ | ○ |

(b)

| NOTIFICATION DEVICE | DISPLAY | SOUND | GESTURE | REMOTE CONTROL |
|---|---|---|---|---|
| CLEANING ROBOT | × | ○ | × | ○ |
| REFRIGERATOR | × | ○ | × | × |
| SMARTPHONE | ○ | ○ | × | × |
| TELEVISION | × | × | ○ | ○ |
| GAMING DEVICE | ○ | ○ | ○ | ○ |

CONTROLLING DEVICE, CONTROLLED DEVICE, CONTROLLING METHOD, CONTROLLING SYSTEM, STORAGE MEDIUM, AND NOTIFICATION DEVICE

This Nonprovisional application claims priority under 35 U.S.C. § 119 on Patent Applications No. 2013-202481 and 2013-202485 each filed in Japan on Sep. 27, 2013, the entire contents of which are hereby incorporated by reference.

TECHNICAL FIELD

The present invention relates to (I) a controlling device for controlling a plurality of devices, (II) a controlled device, (III) a controlling method, and (IV) a storage medium for storing a control program. The present invention also relates to (A) a controlling device for causing notification of a suggestion concerning device use, (B) a controlling method, (C) a controlling system, (D) a storage medium for storing a control program, and (E) a notification device for notification of the suggestion.

BACKGROUND ART

In recent years, there has been a known technology by which (i) home electrical appliances installed in a residential building are connected to a network and (ii) a user is notified of the status of one home electrical appliance by use of another home electrical appliance in the vicinity of the user.

For example, Patent Literature 1 discloses a technology in which, in a case where it is determined that a notification of the status of a device should be given to a user, notifying means located in the vicinity of the user is used to notify the user of the status of the device. With the technology, it is possible to efficiently notify the user of statuses of respective devices.

CITATION LIST

Patent Literature

Patent Literature 1
Japanese Patent Application Publication, Tokukai, No. 2003-162626 (Publication Date: Jun. 6, 2003)

SUMMARY OF INVENTION

Technical Problem

While the conventional technology of Patent Literature 1 makes it possible to notify a user of the status of a device, the conventional technology poses a problem (Problem 1) in regard to proper controls of the device for the user. For example, in a case where the conventional technology is applied to a washing/drying machine, although the user can be notified that laundry has been completed, it is difficult to properly control the washing/drying machine for a user.

The present invention has been made in view of Problem 1, and it is an object of the present invention to provide a controlling device capable of controlling devices more properly for users than is the case of a conventional technology.

Furthermore, while the conventional technology disclosed in Patent Literature 1 makes it possible to notify a user of the status of a device, the conventional technology poses another problem (Problem 2) in regard to proper suggestions to the user. For example, in a case where the conventional technology is applied to a washing/drying machine, it is difficult, although a user can be notified that laundry has been completed, to provide the user with information that assists the user in determining what to do next.

The present invention has been made in view of Problem 2, and it is an object of the present invention to provide a controlling device capable of more properly suggesting what a user should do in accordance with the status of/information on a device than is the cases of a conventional technology.

Solution to Problem

In order to solve Problem 1, a controlling device in accordance with one aspect includes: controlling units configured to control respective of a plurality of devices; and a master controlling unit configured to determine, by referring to information obtained from one of the plurality of devices, a control matter concerning how to control another one of the plurality of devices.

In order to solve Problem 1, a controlled device in accordance with one aspect of the present invention is controlled in accordance with an instruction of a controlling device, which instruction is determined by referring to information obtained from another controlled device managed by the controlling device.

In order to solve Problem 1, a controlling method in accordance with one aspect of the present invention includes: a master controlling step of determining, by referring to information obtained from one of a plurality of devices, a control matter concerning how to control another one of the plurality of devices; and a controlling step of controlling the another one of the plurality of devices in accordance with the control matter determined in the master controlling step.

In order to solve Problem 1, the controlling device and the controlled devices can be each realized by use of a computer. In such a case, the scope of the present invention also encompasses a computer-readable non-transitory storage medium stores a program that realizes each of the controlling device and the controlled device by use of the computer by causing the computer to serve as each unit included in each of the controlling device and the controlled device.

In order to solve Problem 1, a controlling system in accordance with one aspect of the present invention includes: a controlling device; and a plurality of controlled devices to be controlled in accordance with an instruction from the controlling device, said controlling device including controlling units configured to control respective of a plurality of controlled devices and a master controlling unit configured to determine, by referring to information obtained from one of the plurality of controlled devices, a control matter concerning how to control another one of the plurality of controlled devices, the another one of the plurality of controlled devices giving a notification in accordance with the instruction.

In order to solve Problem 2, a controlling device in accordance with one aspect of the present invention includes: an operation status information obtaining unit configured to obtain, from a first device, operation status information indicative of an operation status of the first device; an external information obtaining unit configured to obtain external information; a suggestion content determining unit configured to determine, by referring to the operation status information and the external information, suggestion content concerning the first device; and a notification controlling unit configured to cause a second device to give a notification of the suggestion content.

In order to solve Problem 2, a controlling method in accordance with one aspect of the present invention includes: an operation status information obtaining step of obtaining, from a first device, operation status information indicative of an operation status of the first device; an external information obtaining step of obtaining external information; a suggestion content determining step of determining, by referring to the operation status information and the external information, suggestion content concerning the first device; and a notification controlling step of causing a second device to give a notification of the suggestion content.

In order to solve Problem 2, a controlling system in accordance with one aspect of the present invention includes: a controlling device; and a second device; said controlling device including an operation status information obtaining unit configured to obtain, from a first device, operation status information indicative of an operation status of the first device, an external information obtaining unit configured to obtain external information, a suggestion content determining unit configured to determine, by referring to the operation status information and the external information, suggestion content concerning the first device, and a notification controlling unit configured to cause the second device to give a notification of the suggestion content, said second device including a notifying unit configured to give the notification of the suggestion content.

In order to solve Problem 2, a notification device in accordance with one aspect of the present invention includes: a suggestion content receiving unit configured to receive suggestion content which concerns an operation of another device and which is determined by referring to (i) operation status information indicative of an operation status of the another device and (ii) external information; a notifying unit configured to give a notification of the suggestion content; and an operation receiving unit configured to receive a user's operation indicative of whether or not the user accepts the suggestion content.

In order to solve Problem 2, the controlling device and the notification device can be realized by use of a computer. In such a case, the scope of the present invention also encompasses a computer-readable non-transitory storage medium stores a program that realizes each of the controlling device and the notification device by use of the computer by causing the computer to serve as each unit included in each of the controlling device and the notification device.

Advantageous Effects of Invention

A controlling device in accordance with one aspect of the present invention is capable of controlling a device more properly for a user than is the case of a conventional technology.

A controlling device in accordance with another aspect of the present invention is capable of making a suggestion concerning an action of a user, which suggestion is more appropriate to the status of a device or given information than is the case of a conventional technology.

BRIEF DESCRIPTION OF DRAWINGS

FIG. 9 is a block diagram illustrating hardware configurations of a controlling device and a solar power generating device in accordance with Embodiment 1 of the present invention.

FIG. 13 is a table illustrating suggestion content determined by a suggestion content determining section of the device operation suggestion notification system in accordance with Embodiment 18 of the present invention.

FIG. 14 is a set of views (a) and (b), (a) of FIG. 14 being a table illustrating a method by which a notification device of the present invention gives a notification and (b) of FIG. 14 being a table illustrating a method by which the notification device receives operation content.

DESCRIPTION OF EMBODIMENTS

The following description will discuss embodiments of the present invention in detail.

Embodiment 1

Embodiment 1 of the present invention will be described below in detail.

Figure 1:
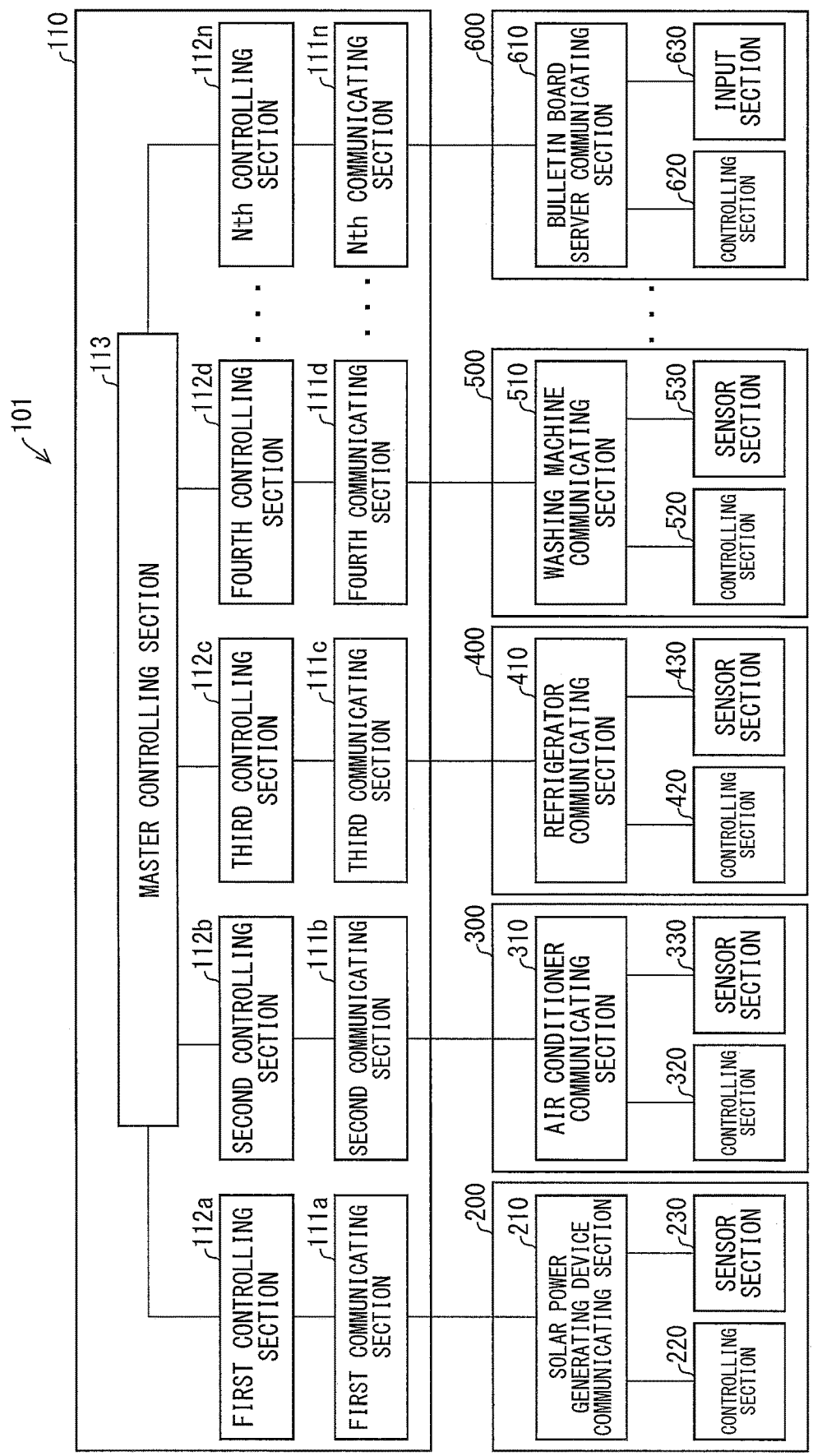
FIG. 1 is a block diagram illustrating a configuration of a device controlling system in accordance with Embodiment 1 of the present invention.

FIG. 1 is a block diagram illustrating a configuration of a device controlling system 101 in accordance with Embodiment 1. As illustrated in FIG. 1, the device controlling system 101 includes a controlling device 110, a solar power generating device 200, an air conditioner 300, a refrigerator 400, a washing machine 500, and a bulletin board server (electronic bulletin board) 600. Note that the all the components in the device controlling system 101 except for the controlling device 110 (which are the solar power generating device 200, the air conditioner 300, the refrigerator 400, the washing machine 500, and the bulletin board server 600) will be collectively referred to as controlled devices (plurality of devices, controlled device). Note also that the controlled devices are not limited to those located in the same building, but can be controlled devices located in different buildings. For example, some of the controlled devices can be located in a user's home whereas the other controlled devices are located in a home of the user's grandmother.

(Configuration of Controlling Device 110)

As illustrated in FIG. 1, the controlling device 110 includes communicating sections 111, controlling sections 112, and a master controlling section (master controlling unit) 113.

The controlling device 110 controls the controlled devices all together. Specifically, the controlling device 110 obtains information from one of the controlled devices, and then, by referring to the information thus obtained, determines a control matter of (how to control) another controlled device. Then, the controlling device 110 controls said another controlled device by supplying, to said another controlled device control information indicative of the control matter thus determined. Note that the controlling device 110 can be included in said "one of the controlled devices" or in "said another controlled device." Alternatively, the controlling device 110 can be provided apart from said "one of the controlled devices" and "said another controlled device."

A first communicating section 111a, a second communicating section 111b, a third communicating section 111c, a fourth communicating section 111d . . . and an Nth communicating section 111n are capable of transmitting/receiving data to/from corresponding controlled devices connected thereto. Note that the first communicating section 111a, the second communicating section 111b, the third communicating section 111c, the fourth communicating section 111d . . . the Nth communicating section 111n are collectively referred to as the communicating sections 111.

A first controlling section (controlling unit) 112a, a second controlling section 112b, a third controlling section 112c, a fourth controlling section 112d . . . and an Nth controlling section 112n control corresponding controlled devices via the communicating sections 111. Note that the first controlling section 112a, the second controlling section 112b, the third controlling section 112c, the fourth controlling section 112d . . . and the Nth controlling section 112n are collectively referred to as the controlling sections 112.

The master controlling section 113 obtains information from one of the controlled devices, and then, by referring to the information thus obtained, determines a control matter of another controlled device. Then, the master controlling section 113 supplies, to the controlling sections 112, control information indicative of the control matters thus determined.

Note that in the following description of data transmission/reception between the controlling device 110 and the controlled devices, (i) operations of the communicating sections 111 to obtain information supplied from the controlling sections 112 and then to supply the information to the controlled devices will be described as the controlling sections 112 supplying the information to the controlled devices and (ii) operations of the communicating sections 111 to obtain information supplied from the controlled devices and then to supply the information to the controlling sections 112 will be described as the controlling sections 112 obtaining the information from the controlled devices.

(Hardware Configuration of Controlling Device 110)

FIG. 9 is a set of block diagrams illustrating hardware configurations of the controlling device 110 and of the solar power generating device 200. (a) of FIG. 9 is a block diagram illustrating the hardware configuration of the controlling device 110. As illustrated in (a) of FIG. 9, the controlling device 110 includes a communicating section 1110, a controlling section 1120, and a storage section 1140.

The communicating section 1110 is an interface for enabling communication with an external device. The communicating section 1110 realizes the above described function of the communicating sections 111.

The storage section 1140 includes a main storage section and an auxiliary storage section. Examples of a device that can be used as a main storage section of the storage section 1140 encompass a semiconductor RAM. Examples of a device that can be used as an auxiliary storage section of the storage section 1140 encompass a hard disk drive. In the auxiliary storage section, a control program for operating the controlling device 110 is stored. The control program is a program for realizing the functions of the controlling sections 112 and of the master controlling section 113.

The controlling section 1120 loads the control program on the main storage section of the storage section 1140, and realizes the functions of the controlling sections 112 and of the master controlling section 113 by executing instructions included in the control program thus compiled. Examples of a device that can be used as the controlling section 1120 encompass a CPU.

(Configurations of Controlled Devices)

Configurations of the controlled devices will be described below.

First, a solar power generating device communicating section 210, an air conditioner communicating section 310, a refrigerator communicating section 410, a washing machine communicating section 510, and a bulletin board server communicating section 610, which are included in the respective controlled devices, are capable of transmitting/receiving data to/from the controlling device 110. Note that the solar power generating device communicating section 210, the air conditioner communicating section 310, the refrigerator communicating section 410, the washing machine communicating section 510, and the bulletin board server communicating section 610 will be collectively referred to as communicating sections of the controlled devices.

Next, a controlling section 220, a controlling section 320, a controlling section 420, a controlling section 520, and a controlling section 620, which are included in the respective controlled devices, are configured to control overall configurations of the respective controlled devices. Specifically, they obtain operation status information indicative of operation statuses of the respective controlled devices, and then supply the information to the controlling device 110 via the respective communicating sections of the controlled devices. Examples of the operation status information encompass (i) information indicative of whether or not a controlled device is in operation, and, if it is, what operation is being carried out and (ii) setting information (such as whether a timer setting of the air conditioner 300 is turned on, what time the timer is set to, and whether a dryer setting of the washing machine 500 is turned on) of the controlled devices. Note that the controlling section 220, the controlling section 320, the controlling section 420, the controlling section 520, and the controlling section 620 will be collectively referred to as controlling sections of the controlled devices. The controlling sections of the controlled devices are also configured to cause the respective controlled devices to execute control matters indicated by control information obtained from the controlling device 110.

Next, a sensor section 230, a sensor section 330, a sensor section 430, and a sensor section 530, which are included in the respective controlled devices, are each a device that detects various changes in a surrounding environment, and then converts the changes into signals. Note that the sensor section 230, the sensor section 330, the sensor section 430, and the sensor section 530 are collectively referred to as sensor sections of the controlled devices. According to Embodiment 1, objects to be detected by the sensor sections of the controlled devices are changes in physical quantities of light, sound, temperature, and the like. However, the objects are not limited to these, but can be changes in (i) physical quantities of physical force, magnetic force, and the like, (ii) physical properties, and (iii) chemical quantities such as concentrations.

Note that the controlled devices in accordance with Embodiment 1 of the present invention are not limited to those described above, but can be any controlled device, provided that the controlled device includes (i) an obtaining unit configured to obtain control information from the controlling device and (ii) a controlling unit configured to control overall configurations of the controlled devices so as to execute control matters indicated by the control information. Other examples of a controlled device encompass a cleaning robot 700, a television 800, and a cooking device, which will be described later.

The bulletin board server 600 will be described next.

The bulletin board server 600 is a bulletin board intended for information exchange between individuals who are limited to certain members whose IDs are managed by the controlling device 110. The controlled devices are also assigned their respective IDs. The bulletin board server 600 is capable of displaying, as content submitted by the controlled devices, information supplied from the controlled devices. A user inputs content into the bulletin board server and browses content displayed on the bulletin board server by operating a mobile device such as a smartphone. The bulletin board server 600 (i) displays instructional information for each of the controlled devices, which instructional information is inputted by the user via an input section 630 and (ii) supplies, to the controlling device 110, an operation signal which instructs that an operation indicated by the operation status information be carried out.

Note that in the following description of data transmission/reception between the controlling device 110 and the controlled devices, (i) operations of the communicating sections of the controlled devices to obtain information supplied from the controlling sections of the controlled devices, from the sensor sections of the controlled devices, and from the input section 630 and then to supply the information to the controlling device 110 will be described as the controlling sections of the controlled devices supplying the information to the controlling device 110 and (ii) operations of the communicating sections of the controlled devices to obtain information supplied from the controlling device 110 and then to supply the information to the controlling sections of the controlled devices will be described as the controlling sections of the controlled devices obtaining the information from the controlling device 110.

(Hardware Configurations of Controlled Devices)

(b) of FIG. 9 is a block diagram illustrating the hardware configuration of the solar power generating device 200. The hardware configurations of the controlled devices will be described by use of an example of the solar power generating device 200. As illustrated in (b) of FIG. 9, the solar power generating device 200 includes a communicating section 2100, a controlling section 2200, a storage section 2300, a sensor 2400, and an input receiving section 2500.

The communicating section 2100 is an interface that enables communication with an external device. The communicating section 2100 realizes the function of the solar power generating device communicating section 210.

The storage section 2300 includes a main storage section and an auxiliary storage section. Examples of a device that can be used as a main storage section of the storage section 2300 encompass a semiconductor RAM. Examples of a device that can be used as an auxiliary storage section of the storage section 2300 encompass a hard disk drive. In the auxiliary storage section, a control program for operating the solar power generating device 200 is stored. The control program is a program for realizing the function of the controlling section 220.

The controlling section 2200 loads the control program on the main storage section of the storage section 2300, and realizes the function of the controlling section 220 by executing instructions included in the control program thus compiled. Examples of a device that can be used as the controlling section 2200 encompass a CPU.

The sensor 2400 detects various changes in a surrounding environment, and then converts the changes into signals. Examples of the sensor 2400 encompass a motion detector, a temperature sensor, and a humidity sensor. The sensor 2400 realizes the function of the sensor section 230.

The input receiving section 2500 is a device for receiving an input of a user, and examples of the input receiving section 2500 encompass a switch, a button, and a touch panel. The input receiving section 2500 outputs, as an operation signal, the input of the user thus received.

As mentioned above, (b) of FIG. 9 illustrates the hardware configurations of the controlled devices by use of the example of the solar power generating device 200. Therefore, the hardware configuration of the air conditioner 300 is similar to the hardware configuration shown in the block diagram of (b) of FIG. 9. That is, the air conditioner communicating section 310 can be realized by a communicating section 2100, the controlling section 320 can be realized by a controlling section 2200, and the sensor section 330 can be realized by a sensor 2400. As another example, the bulletin board server communicating section 610 of the bulletin board server 600 can be realized by a communicating section 2100, the controlling section 620 can be realized by a controlling section 2200, and the input section 630 can be realized by an input receiving section 2500.

(Process of Device Controlling System 101)

Figure 2:
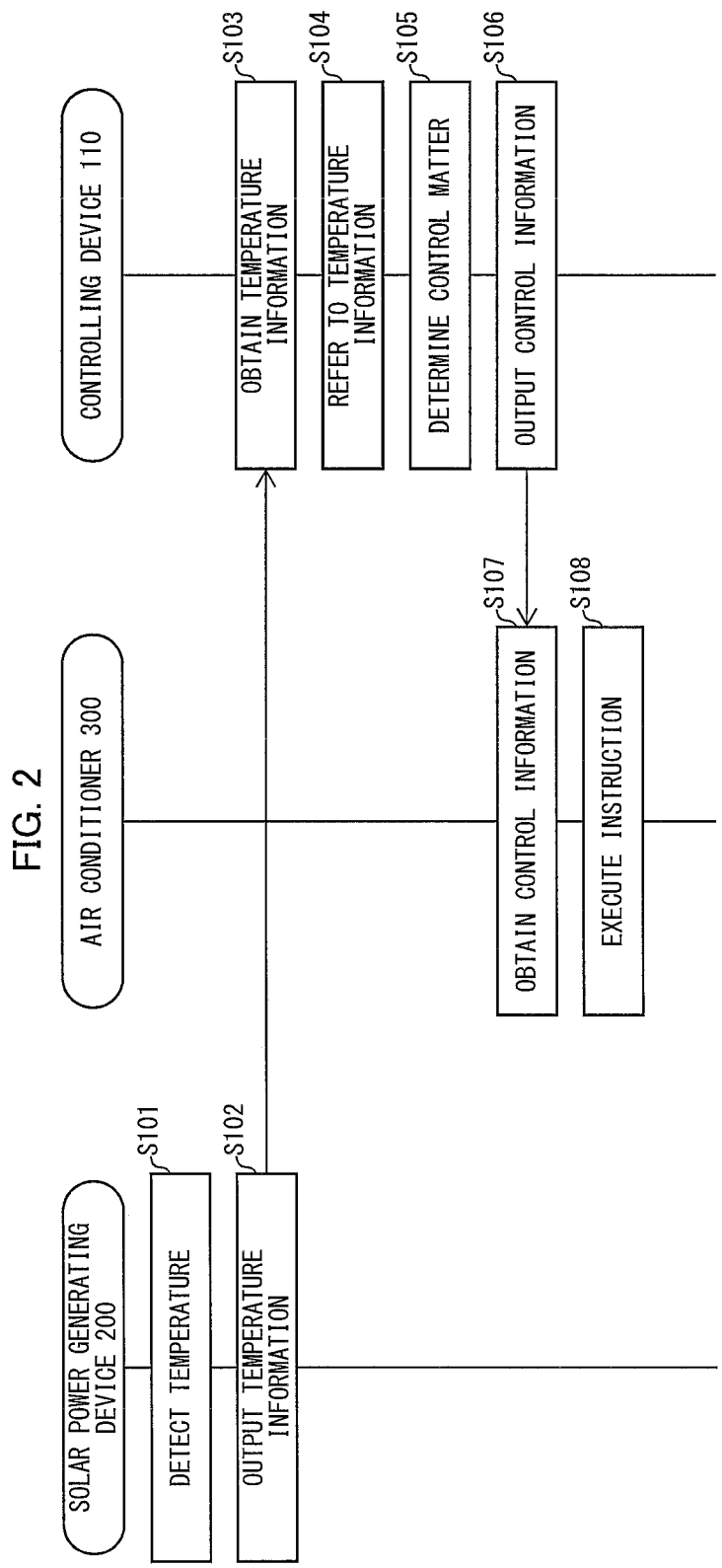
FIG. 2 is a sequence diagram showing a flow of a process of the device controlling system in accordance with Embodiment 1 of the present invention.

FIG. 2 is a sequence diagram showing a flow of a process of the device controlling system 101 in accordance with Embodiment 1 of the present invention. The process of the device controlling system 101 will be described below with reference to FIG. 2.

First, the sensor section 230 of the solar power generating device 200 detects outside air temperature (Step S101). Then, the controlling section 220 supplies, to the controlling device 110, temperature information indicative of the outside air temperature thus detected by the sensor section 230 (Step S102).

The first controlling section 112a of the controlling device 110 obtains the temperature information supplied from the solar power generating device 200 (Step S103), and supplies the temperature information to the master controlling section 113. The master controlling section 113 refers to the temperature information thus obtained (Step S104), and determines a control matter to be executed by a controlled device (Step S105, Master controlling step). For example, in a case where temperature information received by the master controlling section 113 indicates that outside air temperature is 35° C., the master controlling section 113 determines that control matter for the air conditioner 300 to be "controlling the air conditioner 300 to verbally notify a user that it is hot outside." Then, in order to supply the air conditioner with control information indicative of the control matter thus determined, the master controlling section 113 supplies the control information to the second controlling section 112b. Then, the second controlling section 112b supplies the control information to the air conditioner 300 (Step S106, Controlling step).

The controlling section 320 of the air conditioner 300 obtains the control information supplied from the controlling device 110 (Step S107). Then, the controlling section 320 executes the control matter which is to verbally notify the user that it is hot outside, which control matter is indicated by the control information thus obtained (Step S108). An example of such a control matter is that the air conditioner 300 outputs an artificial voice saying "It is hot outside. Please be alert to a heat stroke."

The device controlling system 101 of Embodiment 1 is thus capable of controlling the air conditioner 300, which is a controlled device other than the solar power generating device 200, to carry out an instruction indicated by a control matter determined by referring to outside air temperature detected by the solar power generating device 200. Therefore, the controlling device 110 is capable of controlling a plurality of devices in closer relation to one another than is the case of a conventional technology. The controlling device 110 is also capable of controlling devices more properly for a user.

In addition, by obtaining temperature information indicating that it is hot outside, the controlling device 110 is also capable of offering a suggestion to a user for use of the air conditioner 300, such as "Please be alert to a heat stroke."

Another specific example of the control matter is to notify a user of information concerning weather and climate. However, Embodiment 1 is not limited to such an example.

Embodiment 2

Embodiment 1 discussed the example in which a controlled device that outputs information is different from a controlled device that is controlled by the controlling device 110. In contrast, Embodiment 2 will discuss, also with reference to FIG. 2, an example in which a controlled device that outputs information is the controlled device to be controlled by a controlling device 110.

In a step S103 shown in FIG. 2, for example, the controlling device 110 obtains, from an air conditioner 300, maintenance information concerning maintenance of the air conditioner 300. Then, in a step S104, a master controlling section 113 refers to the maintenance information, and, in a step S105, determines a control matter to be carried out by a controlled device. In a case where, for example, the maintenance information obtained by the master controlling section 113 indicates that maintenance of the air conditioner 300 has not been carried out for a month, the master controlling section 113 determines a control matter to be "controlling the air conditioner 300 to verbally notify a user of a suggestion for maintenance of the air conditioner 300." An example of such a control matter is that the air conditioner 300 outputs an artificial voice saying "Cough, cough! Ummm . . . I'm not in good shape. Would you please run a maintenance service on me sometime soon?"

According to Embodiment 2, in a case where (i) the controlling device 110 obtains information on whether or not maintenance of a given controlled device was carried out during a predetermined period of time before the present time and (ii) it is determined that the maintenance was not carried out during the predetermined period of time, a user is thus notified and prompted to carry out maintenance of said given controlled device. Although such a notification is preferably provided by said given controlled device, Embodiment 2 is not limited to such an example. For example, it is possible that, in the example described earlier, a refrigerator 400 outputs a voice saying "Mr. AC does not seem to be in good shape. Would you please run a maintenance service on Mr. AC sometime soon?"

Causing a controlled device to offer a suggestion on another controlled device as described above is a type of "personification of devices", which is the inventive concept disclosed herein. According to Embodiment 2 also, the controlling device 110 is capable of controlling devices more properly for a user.

Alternatively, the controlling device 110 can also be configured to (i) control a controlled device to verbally notify a user of a suggestion for the maintenance of the air conditioner 300 and (ii) control a controlled device by referring to information indicating that the user has understood the notification content. For example, the air conditioner 300 outputs an artificial voice, "Cough, cough! Ummm . . . I'm not in good shape. Would you please run a maintenance service on me sometime soon?" Then, the air conditioner 300 obtains voice information of the user in response to the artificial voice, and then outputs the voice information to the controlling device 110. The master controlling section 113 obtains the voice information of the user. In a case where the voice information indicates that the user has understood the notification content, the master controlling section 113 determines a control matter to be "preventing the air conditioner 300 from repeating the notification." An example of the information indicating that the user has understood the notification content is voice information indicating the user's voice saying "Are you okay? I will get you clean later."

In a case where the controlling device 110 thus obtains information indicating a user has understood a notification, the controlling device 110 is capable of controlling a controlled device to be prevented from repeating the notification.

Note that the air conditioner 300 can be configured to store a maintenance date as a history, and designates the history as maintenance information. For example, in a case where (i) the master controlling section 113 obtains, from the air conditioner 300, maintenance information indicating that previous maintenance was carried out on May 30 and (ii) the current date is June 30 or later, the air conditioner 300 can determine that the maintenance of the air conditioner 300 has not been carried out for a month, and then determine a control matter to be "controlling the air conditioner 300 to verbally notify a user of a suggestion for the maintenance of the air conditioner 300." Note that the history of the maintenance date can be stored as follows: The controlling device 110 obtains, from the air conditioner 300, status information indicating that the air conditioner 300 is being subjected to maintenance, and then stores the status information in a storage section 1140 (not illustrated) included in the controlling device 110.

The air conditioner 300 can also be configured to (i) store, as a history (which is an example of sensing data), information concerning an operation of the air conditioner 300 and (ii) supply the operation status information to the controlling device 110. For example, the air conditioner 300 supplies, to the controlling device 110, operation status information indicating that June 10 of a previous year was the first time to run air conditioning in the previous year. In a case where the current date is June 3, the master controlling section 113 can determine a control matter to be "controlling the air conditioner 300 to notifying a user of a suggestion for a test run of the air conditioner."

In a case where the master controlling section 113 obtains sensing data such as operation status information from the air conditioner 300, the master controlling section 113 can determine a control matter by referring to weather information and to a history of the weather information. Examples of the weather information encompass (i) weather forecasts of different locations including a user's location of residence, (ii) air temperature, humidity, weather, and the like of said different locations at the current time, and (iii) air temperature, humidity, weather, and the like of said different locations in the past. For example, in a case where the current date is June 10 and where the master controlling section 113 obtains, from the air conditioner 300, operation status information indicating that June 10 of a previous year was the first time to run air conditioning in the previous year, the master controlling section 113 obtains weather information of June 10 of the previous year by referring to a history of weather information. Then, in a case where the weather information indicates that the highest air temperature of June 10 of the previous year was 30° C., the master controlling section 113 obtains weather information containing information on expected highest temperatures of at least the next three days. In a case where the weather information thus obtained indicates the expected highest air temperature of June 13 (three days from the current date) of 30° C., the master controlling section 113 can determine a control matter to be "controlling the air conditioner 300 to notify a user of a suggestion for a test run of the air conditioner."

In addition, the master controlling section 113 can determine a control matter by referring to electric power consumption information and a history of the electric power consumption information. Examples of the electric power consumption information encompass information on (i) electric power that is consumed in a residential building and (ii) time at which electric power sent from an electric power plant is consumed at a maximum level (e.g. information indicating that electric power consumption reaches an urgent level around 14:00). In such a case, the controlling device 110 can determine a control matter to be "controlling the air conditioner 300 to notify a user of a suggestion for an increase in temperature setting of the air conditioner 300." Alternatively, the controlling device 110 can also determine the control matter to be "controlling the air conditioner 300 to notify the user that the temperature setting will be turned up at 14:00."

The controlling device 110 can thus determine a control matter by referring to history information. This makes it possible to remind a user of information forgotten by the user and/or to predict what actions the user may take.

Embodiment 3

Embodiments 1 and 2 discussed the examples in which the controlling device 110 refers to information supplied from a single controlled device. In contrast, Embodiment 3 will discuss, also with reference to FIG. 2, an example in which a controlling device 110 refers to a plurality of pieces of information.

In a step S103 shown in FIG. 2, for example, the controlling device 110 is configured to (i) obtain, from a solar power generating device 200, power generation amount information indicative of the amount of electric power generation and (ii) obtain weather information from a weather information obtaining device (not illustrated) (this configuration (ii) also applies to other embodiments). Note that the weather information obtaining device is a device which obtains weather information from a network and which is controlled by a fifth controlling section 112e via a fifth communicating sections 111e of the controlling device 110.

Then, in a step S104, the master controlling section 113 refers to the power generation amount information and the weather information thus obtained, and, in a step S105, determines a control matter to be carried out by a controlled device. For example, in a case where (i) the power generation amount information indicates that the amount of electric power currently generated is less than the amount of electric power generated an hour ago and (ii) the weather information indicates that it is going to rain, the master controlling section 113 determines a control matter to be "controlling a controlled device to verbally notify a user of a suggestion for a reduction in the amount of electric power consumption." An example of such a control matter is that an air conditioner 300 outputs an artificial voice saying "Here is a message from Mr. Solar: 'I cannot generate electric power in case of rain. Please reduce the use of air conditioning in order to meet the power saving goal of the current month.'"

As has been described, suggestion content in accordance with Embodiment 3 preferably includes not only a suggestion for a reduction in electric power consumption such as "Please reduce the use of air conditioning", but also a reason for offering such a suggestion (in the above example, "I cannot generate electric power in case of rain"). Since the suggestion content includes the reason therefor, it is possible to more effectively offer a suggestion to a user. According to Embodiment 3 also, the controlling device 110 is capable of controlling devices more properly for a user.

Note that the suggestion content herein means (i) a suggestion on what action a user should take and (ii) a suggestion that basically concerns an operation of a controlled device.

Embodiment 4

Embodiments 1 through 3 discussed the examples in which the controlling device 110 only controls a controlled device to make a notification to a user. In contrast, Embodiment 4 will discuss, with reference to FIG. 3, an example in which a controlling device 110 obtains a user's instructional information in response to a notification from a controlled device.

(Process of Device Controlling System 101)

Figure 3:
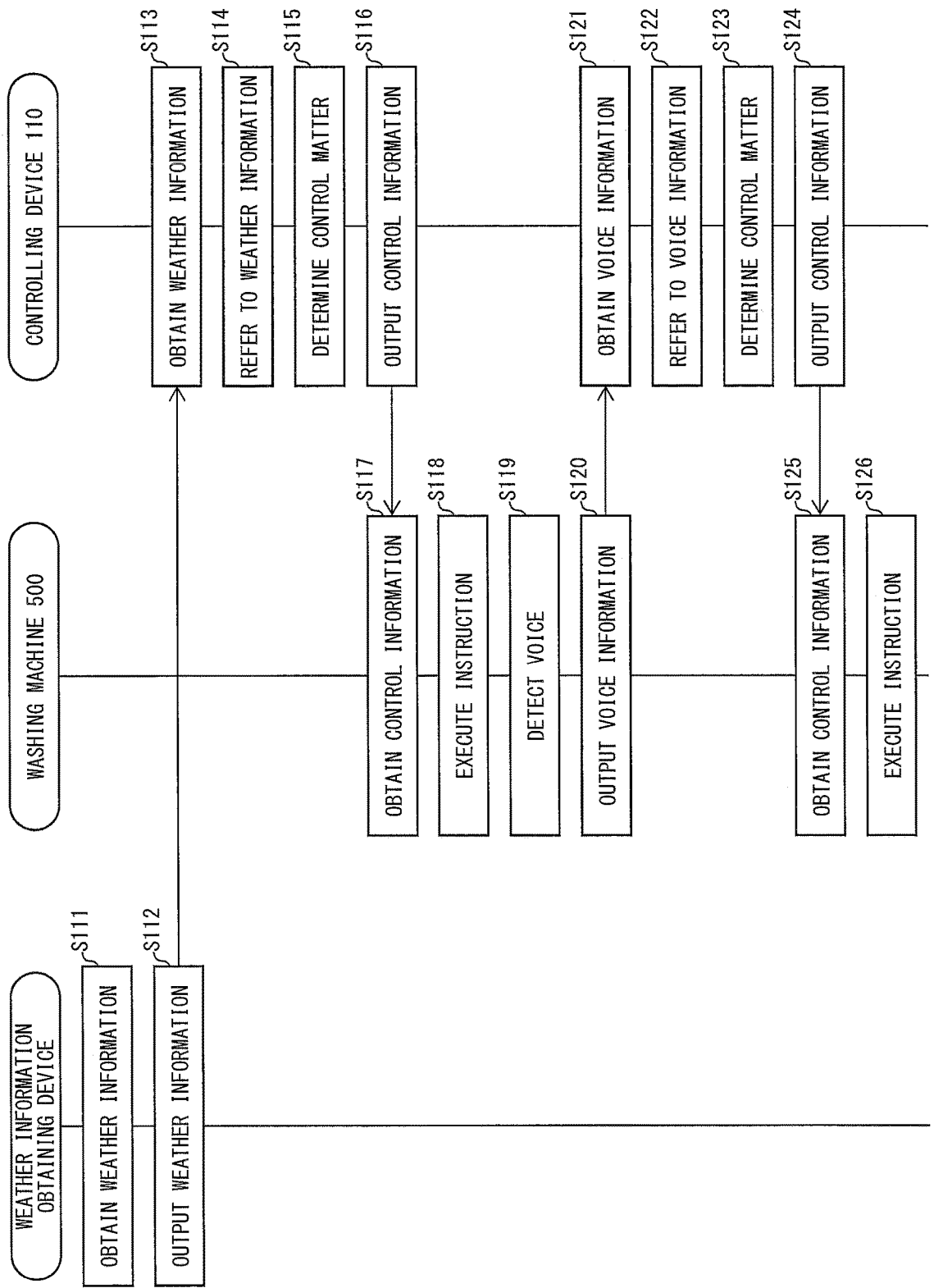
FIG. 3 is a sequence diagram showing a flow of a process of a device controlling system in accordance with Embodiment 4 of the present invention.

FIG. 3 is a sequence diagram showing a flow of a process of a device controlling system 101 in accordance with Embodiment 3 of the present invention. The process of the device controlling system 101 will be described below with reference to FIG. 3.

First, a controlling section of a weather information obtaining device (not illustrated) obtains weather information (Step S111). Then, the controlling section of the weather information obtaining device supplies to weather information to the controlling device 110 (Step S112).

A fifth controlling section 112e of a controlling sections 112 of the controlling device 110 obtains the weather information supplied from the weather information obtaining device (Step S113), and then supplies the weather information to a master controlling section 113. The master controlling section 113 refers to the weather information thus obtained (Step S114), and determines a control matter to be carried out by a controlled device (Step S115). In a case where, for example, the weather information obtained by the master controlling section 113 indicates that it is going to rain, the master controlling section 113 determines the control matter for the washing machine 500 to be "controlling the washing machine 500 to (i) suggest that a user use a dryer and (ii) verbally notify the user of an inquiry as to whether or not to use the dryer." Then, in order to supply a washing machine 500 with control information indicative of the control matter thus determined, the master controlling section 113 supplies the control information to a fourth controlling section 112d. Then, the fourth controlling section 112d supplies the control information to the washing machine 500 (Step S116).

A controlling section 520 of the washing machine 500 obtains the control information supplied from the controlling device 110 (Step S117). Then, the controlling section 520 carries out, as indicated by the control information thus obtained, instructions to (i) suggest that the user use the dryer and (ii) notify the user of an inquiry as to whether or not to use the dryer (Step S118). An example of such a control matter is that the washing machine 500 outputs an artificial voice saying "Since it is about to rain, would you like to proceed to drying?" Alternatively, it is also possible that, instead of the washing machine 500, another controlled device outputs an artificial voice saying "Here is a message from Mr. Laundry: 'Since it is about to rain, would you like to proceed to drying?'" Said another controlled device to output the artificial voice (provide a notification) can be a controlled device which detected that the user is located in the proximity, such as a controlled device which detected that the user made an operation or a controlled device which detected, by use of a motion detector, the user in the proximity.

In response to the voice of the washing machine 500, the user verbally replies "Oh, I see. Please go ahead, then", for example. Then, a sensor section 530 of the washing machine 500 detects the voice of the user (Step S119). Then, the controlling section 520 supplies, to the controlling device 110, voice information indicative of the voice detected by the sensor section 530 (Step S120).

The fourth controlling section 112d of the controlling sections 112 of the controlling device 110 obtains the voice information supplied from the washing machine 500 (Step S121), and then supplies the voice information to the master controlling section 113. Then, the master controlling section 113 refers to the voice information thus obtained (Step S122), and then determines a control matter to be carried out by a controlled device (Step S123). In a case where, for example, the voice information indicates that the suggestion was accepted as "Oh, I see. Please go ahead, then" (see above), the master controlling section 113 determines a control matter for the washing machine 500 to be "controlling the washing machine 500 to use the dryer after the laundry is over." Then, in order to supply the washing machine 500 with control information indicative of the control matter thus determined, the master controlling section 113 supplies the control information to the fourth controlling section 112d. Then, the fourth controlling section 112d supplies the control information to the washing machine 500 (Step S124).

Then, the controlling section 520 of the washing machine 500 obtains the control information supplied from the controlling device 110 (Step S125). Then, the controlling section 520 carries out, as indicated by the control information, an instruction to use the dryer function after the laundry is over (Step S126).

According to the device controlling system 101 of Embodiment 4, the controlling device 110 is thus capable of controlling, by referring to weather information, the washing machine 500 to verbally ask a user whether or not to use the dryer function. In addition, the controlling device 110 is capable of controlling, by referring to a verbal reply of the user, the washing machine 500 as desired by the user. Therefore, a controlled device is personified according to the device controlling system 101. This makes it possible to receive an operation of the user without forcing the user into any difficult operation. According to Embodiment 4 also, the controlling device 110 is capable of controlling devices more properly for a user.

Embodiment 5

Embodiment 4 discussed the example in which the controlling device 110 refers to information supplied from a single controlled device. In contrast, Embodiment 5 will discuss, also with reference to FIG. 3, an example in which a controlling device 110 refers to a plurality of pieces of information.

In a step S113 shown in FIG. 3, for example, the controlling device 110 (i) obtains, from a refrigerator 400, status information indicating that the refrigerator 400 is being opened, (ii) obtains, from the refrigerator 400, voice information indicating a voice of a user who is preparing to cook, and (iii) obtains, from a health care device (not illustrated), health information on a husband of the user. An example of the voice of the user (wife) preparing to cook is a voice saying "what should I make for dinner?" The health information herein refers to information concerning health and condition of a given subject. Examples of the health information encompass (i) information concerning an increase/decrease in weight of the subject and (ii) information concerning results of a medical examination the subject received at a medical institution. As information concerning an increase/decrease in weight of the subject, information obtained by a weight scale at the subject's home can be used.

Then, in a step S114, the master controlling section 113 refers to the status information, the voice information, and the health information thus obtained, and, in a step S115, determines a control matter to be carried out by a controlled device. In a case where, for example, the health information indicates a high cholesterol level of the husband, the master controlling section 113 determines the control matter to be "controlling a controlled device to verbally notify the user of a suggestion for a healthy meal." An example of such a control matter is that a cooking device (not illustrated) outputs an artificial voice saying "Since the cholesterol levels of your husband have been high, why don't you select a healthy meal out of a health support menu?"

According to Embodiment 5, a more appropriate meal is suggested by referring to health information of a given subject. In addition, according to a device controlling system 101 of Embodiment 5, the controlling device 110 is capable of controlling a controlled device by referring to a plurality of pieces of information including voice information of a user. This makes it possible to receive an operation of a user without forcing the user into a difficult operation. According to Embodiment 5 also, the controlling device 110 is capable of controlling devices more properly for a user.

Embodiment 6

Embodiment 6 will discuss, also with reference to FIG. 3, an example in which a controlling device 110 refers to image information.

In a step S113 shown in FIG. 3, for example, the controlling device 110 obtains, from a refrigerator 400, image information on an image of inside the refrigerator. Then, in a step S114, a master controlling section 113 refers to the image information thus obtained, and, in a step S115, determines a control matter to be carried out by a controlled device. For example, in a case where the image information indicates that eggs and milk are expiring on the next day, the master controlling section 113 determines the control matter to be "controlling a controlled device to verbally notify a user of a suggestion for a meal using eggs and milk." An example of such a control matter is that a cooking device (not illustrated) outputs an artificial voice saying "Eggs and milk are expiring soon. Would you like to make cream puffs?" According to Embodiment 6, the controlling device 110 thus (i) monitors an expiration date of each food (ingredient) stored in the refrigerator 400 and (ii) suggest, to a user, a meal using ingredients that are expiring soon. According to a device controlling system 101 of Embodiment 6, the controlling device 110 is thus capable of controlling a controlled device by referring to image information. According to Embodiment 6 also, the controlling device 110 is capable of controlling devices more properly for a user.

Alternatively, the controlling device 110 can also be configured to (i) detect, out of all the foods stored in the refrigerator 400, a food(s) that is running out and (ii) control a controlled device.

For example, a refrigerator 400, which includes a weight sensor where milk is to be stored, (i) detects the weight of milk and (ii) outputs, to the controlling device 110, weight information indicative of the weight of the milk. The master controlling section 113 receives the weight information supplied from the refrigerator 400. In a case where the weight information indicates that milk is running short, the master controlling section 113 obtains purchase information of a user. Note that the purchase information herein means information indicative of a history of the user's purchases, delivery statuses of items purchased, and the like. While the purchase information can be information stored in a purchase managing device (not illustrated), it can also be information that is owned by an online store. Then, in a case where the purchase information thus obtained indicates that the user has already purchased milk and the milk is scheduled to be delivered on the next day, the master controlling section 113 determines a control matter to be "controlling a controlled device to verbally notify the user that the milk will be delivered on the next day." An example of such a control matter is that the refrigerator 400 outputs an artificial voice saying "Milk will be delivered from the grocery store tomorrow."

Alternatively, it is also possible to detect, by voice information of a user, information concerning an ingredient(s) that is running out.

For example, a user opens a refrigerator 400, and a sensor section 430 detects a voice of the user indicating that milk is running short. The refrigerator 400 outputs, to a controlling device 110, voice information indicating the voice of the user thus detected. The master controlling section 113 obtains the voice information supplied from the refrigerator 400. In a case where the voice information indicates that the milk is running short, the master controlling section 113 obtains purchase information of the user. In a case where the purchase information thus obtained indicates that the user has already purchased milk and the milk is scheduled to be delivered on the next day, the master controlling section 113 determines a control matter to be "controlling a controlled device to verbally notify the user that the milk will be delivered tomorrow." An example of the voice of the user indicating that the milk is running short is a voice saying "Milk is running out soon."

The controlling device 110 thus monitors the status of each food stored in the refrigerator 400, and is therefore recognizing it if any food is running short. The controlling device 110 is also capable of preventing, by obtaining purchase information, a user from running out of food.

Embodiment 7

Embodiment 7 will discuss an example in which a controlling device 110 controls a bulletin board server 600.

(Process of Device Controlling System 101)

Figure 4:
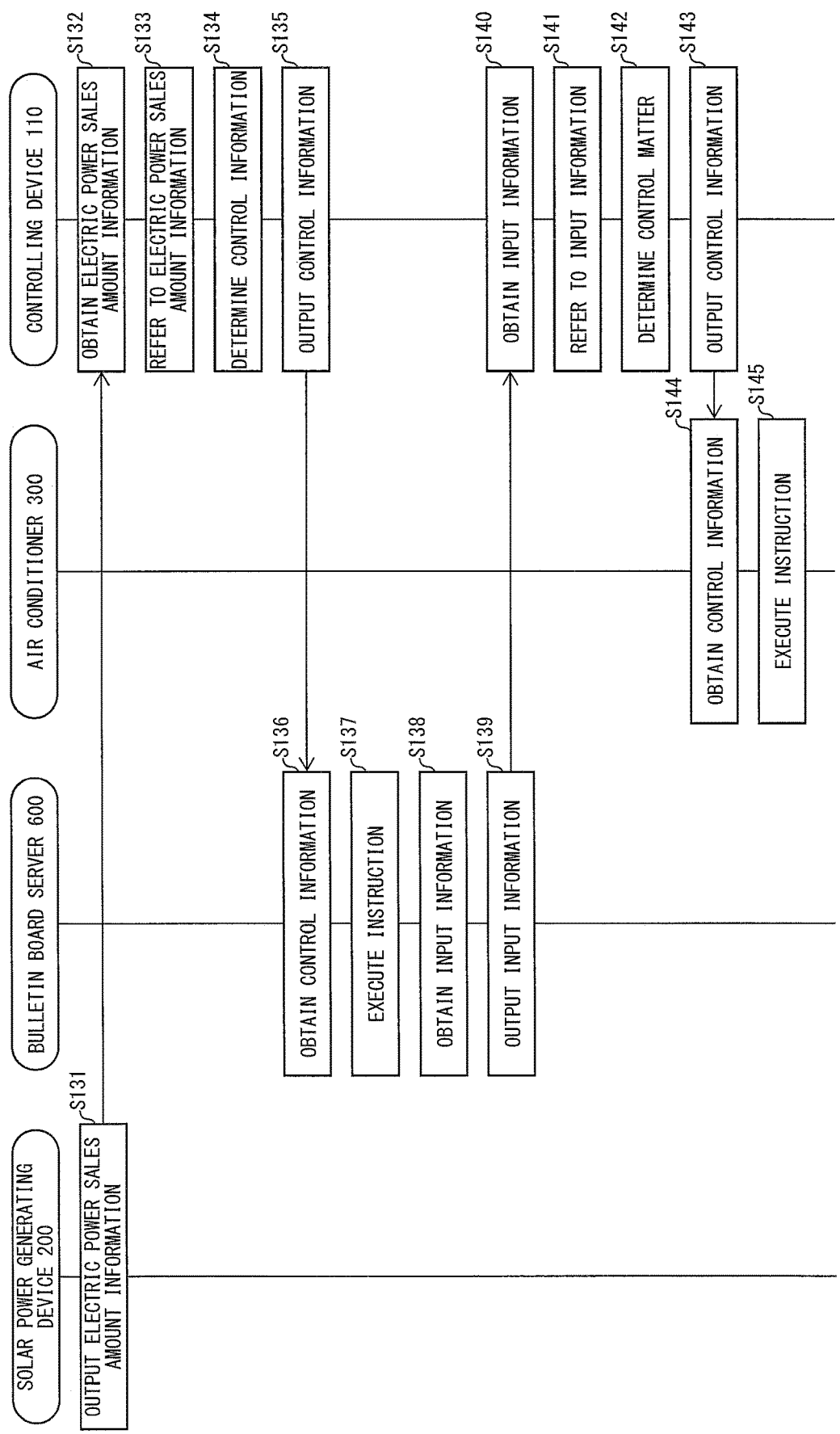
FIG. 4 is a sequence diagram showing a flow of a process of a device controlling system in accordance with Embodiment 7 of the present invention.

FIG. 4 is a sequence diagram showing a flow of a process of a device controlling system 101 in accordance with Embodiment 7 of the present invention. The process of the device controlling system 101 will be described below with reference to FIG. 4.

First, a controlling section 220 of a solar power generating device 200 outputs, to the controlling device 110, electric power sales amount information indicative of how much of electric power generated by the solar power generating device 200 is sold (Step S131).

A first controlling section 112a of the controlling device 110 obtains the electric power sales amount information supplied from the solar power generating device 200 (Step S132), and then outputs the electric power sales amount information to a master controlling section 113. The master controlling section 113 refers to the electric power sales amount information thus obtained (Step S133), and then determines a control matter to be carried out by a controlled device (Step S134). In a case where, for example, the electric power sales amount information indicates that the amount of electric power sold is 20 kw, the master controlling section 113 determines the control matter to be "controlling the bulletin board server 600 to cause the bulletin board to display, as a content submitted by a solar power generating device, that the amount of electric power sold is 20 kw." Then, in order to output to the bulletin board server 600 control information indicative of the control matter thus determined, the master controlling section 113 outputs the control information to an Nth controlling section 112*n*. The Nth controlling section 112*n* outputs the control information to the bulletin board server 600 (Step S135).

A controlling section 620 of the bulletin board server 600 obtains the control information supplied from the controlling device 110 (Step S136). Then, the controlling section 620 carries out an instruction (indicated by the control information) to cause the bulletin board to display, as the content submitted by the solar power generating device, that the amount of electric power sold is 20 kw) (Step S137).

According to the device controlling system 101, the controlling device 110 is thus capable of causing the bulletin board server 600 to display how much of electric power generated by the solar power generating device 200 is sold. This allows the device controlling system 101 to inform a user, who has access to a bulletin board server, of the status of a controlled device installed at home even in a case where the user is located outside home.

In addition, in other embodiments, a controlling device 110 can be configured to (i) control a controlled device to carry out notification and then (ii) cause a bulletin board server 600 to indicate control information. According to Embodiment 7 also, the controlling device 110 is capable of controlling devices more properly for a user.

Embodiment 8

Embodiment 7 discussed the example in which a user is notified that there is not trouble with the solar power generating device 200, based on the amount of electric power sold. Embodiment 8 will discuss, also with reference to FIG. 4, a process of a device controlling system 101 in a case where a trouble occurs.

For example, in a step S132, a master controlling section 113 (i) obtains electric power sales amount information from a solar power generating device 200 and (ii) obtains weather information from a weather information obtaining device. Then, in a step S133, a master controlling section 113 refers to the electric power sales amount information and the weather information thus obtained, and, in a step S134, determines a control matter to be carried out by a controlled device. For example, in a case where the electric power sales amount information indicates the amount of electric power sold is 0 kw and the weather information indicates fine weather, the master controlling section 113 determines the control matter to be "controlling a bulletin board to display that there is a possibility of trouble occurring." Then, in order to supply to a bulletin board server 600 control information indicative of the control matter thus determined, the master controlling section 113 supplies the control information to an Nth controlling section 112*n*. In a step S135, the Nth controlling section 112*n* supplies the control information to the bulletin board server 600.

A controlling section 620 of the bulletin board server 600 obtains the control information supplied from the controlling device 110 (Step S136). Then, the controlling section 620 carries out an instruction (indicated by the control information thus obtained) to "controlling the bulletin board to display that there is a possibility of trouble occurring" (Step S137).

In so doing, in a case where a husband, who has got off work, browses the bulletin board server 600 via a smartphone, the husband can learn that there may be trouble occurring with the solar power generating device 200. Then, the husband carries out an operation to cause, via the smartphone, the bulletin board server 600 to notify a wife that there may be trouble occurring with the solar power generating device 200.

An input section 630 of the bulletin board server 600 obtains input information indicating "notifying the wife that there may be trouble occurring with the solar power generating device 200" (Step S138). Then, the input section 630 supplies the input information to the controlling device 110 (Step S139).

The Nth controlling section 112*n* of the controlling device 110 obtains the input information supplied from the bulletin board server 600 (Step S140), and supplies the input information to the master controlling section 113. The master controlling section 113 refers to the input information thus obtained (Step S141), and determines a control matter to be carried out by a controlled device (Step S142). In this case, since the input information indicates "notifying the wife that there may be trouble occurring with the solar power generating device 200", such an indication is determined as the control matter. Then, in order to supply to an air conditioner 300 control information indicative of the control matter thus determined, the master controlling section 113 supplies the control information to a second controlling section 112*b*. The second controlling section 112*b* supplies the control information to the air conditioner 300 (Step S143).

A controlling section 320 of the air conditioner 300 obtains the control information supplied from the controlling device 110 (Step S144). Then, the controlling section 320 carries out an instruction (indicated by the control information) to "notify the wife that there may be trouble occurring with the solar power generating device 200" (Step S145). An example of such a control matter is that the air conditioner 300 outputs an artificial voice saying "there may be some trouble with the solar power generating device."

According to the device controlling system 101, the controlling device 110 is thus capable of controlling the bulletin board server 600 to display that there is a possibility of trouble occurring with the solar power generating device 200. This allows the device controlling system 101 to notify a user, who has access to the bulletin board server, of the status of a controlled device installed at home even in a case where the user is located outside home. According to Embodiment 8 also, the controlling device 110 is capable of controlling devices more properly for a user.

Embodiment 9

As mentioned earlier, controlled devices are not limited to those located in the same building, but can be controlled devices located in different buildings. Embodiment 9 will discuss an example in which a controlling device 110 refers to information supplied from a controlled device located at a grandmother's home.

For example, in a case where (i) the controlling device 110 obtains temperature information from a cleaning robot located at the grandmother's home and (ii) the temperature information thus obtained indicates 30° C., the controlling device 110 supplies, to an air conditioner located at the grandmother's home, control information about turning on the air conditioner. Then, a master controlling section 113 of the controlling device 110 determines a control matter to "controlling a controlled device to verbally notify a user that the air conditioner at the grandmother's home has been turned on." An example of such a control matter is that a television outputs an artificial voice saying "Here is a message from Mr. cleaning robot: 'Since it is becoming hot in the grandmother's home, the air conditioner has been turned on.'"

According to a device controlling system 101 of Embodiment 9, the controlling device 110 is thus capable of controlling a controlled device, which is located in a home of a user, by referring to information from a controlled device located in a home different from the home of the user. This makes it possible to notify the user of the status of a controlled device in a home of an individual residing apart from the user, and therefore allows the user to have peace of mind. According to Embodiment 9 also, the controlling device 110 is capable of controlling devices more properly for a user.

Alternatively, the controlling device 110 can control a controlled device by referring to information indicating that a user has confirmed notification content. For example, a television outputs an artificial voice saying "Here is a message from Mr. cleaning robot at grandmother's home. Mr. cleaning robot says, 'Since it is becoming hot in the grandmother's home, the air conditioner has been turned on.'" Then, the television obtains voice information of a user made in response to the voice of the television, and then supplies the voice information to the controlling device 110. In a case where the voice information of the user indicates that the user has confirmed the notification content, the master controlling section 113 manages the notification content as "notification delivered to the user." An example of such voice information is voice information causing a voice saying "Oh, thank you! What a relief to have despite the distance from grandma's home!" In addition, the controlling device 110 can notify the user that the controlling device 110 manages the notification content as a notification already delivered to the user. An example of such a notification is that the television outputs an artificial voice saying "You are welcome!"

Embodiment 10

Embodiment 10 will discuss an example of how a controlled device to supply control information is determined.

When determining a control matter, a controlling device 110 can determine, as a controlled device to supply control information, a controlled device that is located in the vicinity of a user.

For example, it is assumed that the controlling device 110 obtains, from a washing machine 500, status information indicating that a drying cycle has been completed. In so doing, in a case where, for example, the controlling device 110 obtains from a refrigerator 400 status information indicating that the refrigerator is being opened, the controlling device 110 determines that a user is located in the vicinity of the refrigerator 400. This causes the controlling device 110 to designate the refrigerator 400 as a controlled device. Then, the controlling device 110 determines a control matter to "controlling the refrigerator 400 to verbally notify the user that the drying cycle of the washing machine 500 has been completed." An example of such a control matter is that the refrigerator 400 outputs an artificial voice saying "Here is a message from Mr. Laundry: 'The laundry is now dry.'"

According to a device controlling system 101 of Embodiment 10, it is thus possible to control a controlled device, which is located in the vicinity of a user, to give a notification to the user. According to Embodiment 10 also, the controlling device 110 is capable of controlling devices more properly for a user.

Alternatively, the controlling device 110 can also supply control information to a controlled device when the controlled device is turned on.

For example, as described in Embodiment 2, (i) the controlling device 110 obtains, from an air conditioner 300, maintenance information regarding maintenance of the air conditioner 300 and (ii) a master controlling section 113 determines a control matter to "controlling a controlled device to verbally notify a user of a suggestion for maintenance of the air conditioner 300." In so doing, in a case where the master controlling section 113 obtains status information indicating that the air conditioner 300 is turned off, the master controlling section 113 does not output the control matter. In a case where the master controlling section 113 obtains status information indicating that the air conditioner 300 is turned on, the master controlling section 113 supplies the control matter to the air conditioner 300.

The controlling device 110 thus designates, as a controlled device, a device that is turned on. This makes it possible to control a controlled device, which is located in the vicinity of a user, to give a notification to the user.

Embodiment 11

As described in some of the embodiments above, according to each of the embodiments described in the present specification, a controlling device 110 is capable of determining, based on one piece of information obtained, different control matters to be carried out by respective controlled devices.

For example, let it be assumed that a controlling device 110 obtains weather information indicating that weather of the day is expected to be excellent and the highest air temperature of the day is expected to be 35° C. In such a case, a master controlling section 113 (i) determines a control matter for a solar power generating device 200 to be "giving a notification that 'it is pleasant to generate a large amount of electric power'", (ii) determines a control matter for an air conditioner 300 to be "giving a notification that 'Please be alert to a heat stroke. It is recommended to use the air conditioner'", and (iii) determines a control matter for a washing machine 500 to be "giving a notification that 'Since we are having good weather today, it is recommended to hang the laundry outside.'"

To be more general, in a case where the controlling device 110 obtains weather information indicating that weather of the day is expected to be excellent and the highest air temperature of the day is expected to exceed a predetermined threshold, the master controlling section 113 determines the control matters for the respective controlled devices to be (i) "notifying a user that a large amount of electric power will be generated by the solar power generating device 200", (ii) "notifying the user of a suggestion for the use of the air conditioner 300", and (iii) "notifying the user of a suggestion for not using the drying function of the washing machine 500."

According to a device controlling system 101 of Embodiment 11, the controlling device 110 is thus capable of controlling, by referring to one piece of information obtained, a plurality of controlled devices in respective manners.

Embodiment 12

According to the embodiments described in the present specification, a controlling device 110 is capable of determining a control matter by identifying a user.

For example, it is assumed that a cooking device (not illustrated), which is a controlled device, is set so that a meal will be prepared at time at which a user is returning home. The cooking device supplies, to a controlling device 110, setting information indicating such a setting. Then, a master controlling section 113 obtains the setting information. In so doing, in a case where the master controlling section 113 obtains information (included in the setting information) indicating that the "user" has returned home, the master controlling section 113 determines a control matter to be "controlling the cooking device to verbally notify the user that a meal has just become ready in the cooking device." An example of such control information is that an intercom outputs an artificial voice saying "Welcome home. Nice and warm roll cabbages are waiting for you."

Alternatively, the master controlling section 113 can also be configured to, as information indicating the arrival of the user, (i) image information on an image of a person in front of the intercom or (ii) voice information on a voice of the user, such as "I'm home."

Alternatively, it is also possible that (i) a user inputs, in a bulletin board server 600 while being outside home, a time at which the user is returning home and (ii) a controlling device 110 obtains, from the bulletin board server 600, return-home time information indicating what time the user is returning home. Alternatively, it is also possible for the controlling device 110 to obtain the return-home time information from an online navigation service which calculates how long it takes to reach a destination from a current location.

According to a device controlling system 101 of Embodiment 12, the controlling device 110 is capable of notifying, in a case where the controlling device 110 detects that a user is returning home, the user that a meal is ready in a cooking device.

Embodiment 13

According to the embodiments described in the present specification, a controlling device 110 is capable of changing a notification format such as a language and frequency in/with which a controlled device gives a notification to a user. Embodiment 13 will be described below with reference to FIG. 5.

Figure 5:
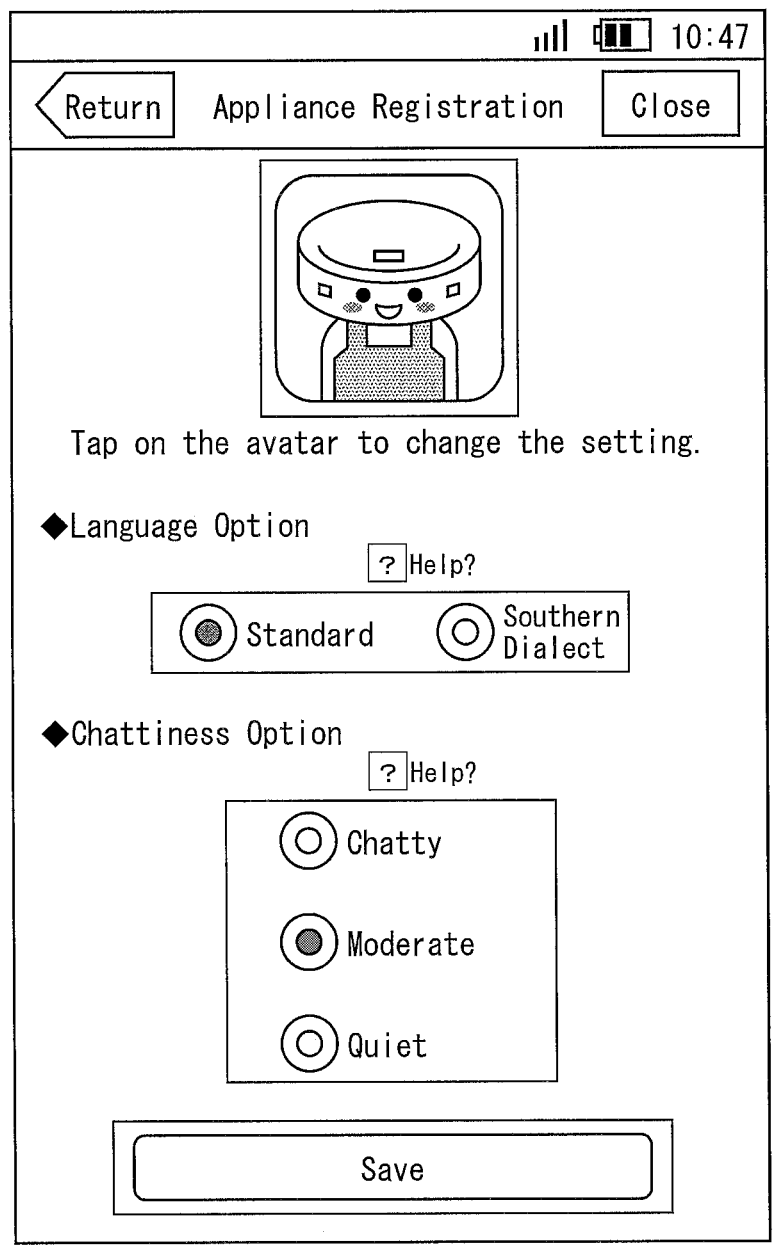
FIG. 5 is view illustrating a screen to be displayed on a device via a bulletin board server of a device controlling system in accordance with Embodiment 13 of the present invention.

FIG. 5 is a view illustrating a screen to be displayed on a device via a bulletin board server 600 of a device controlling system 101 in accordance with Embodiment 13 of the present invention.

The controlling device 110, for example, causes a device to display an image of FIG. 5 via the bulletin board server 600. Then, in a case where a user selects "Southern Dialect" on the "Language Option" menu shown in FIG. 5, a language in which a controlled device gives a notification can be changed to the southern dialect. Note that the linage that can be selected is not limited to the standard language and the southern dialect, but can be one selected from various local dialects, languages of various countries such as French.

In addition, the controlling device 110 can also be configured to change the frequency with which a controlled device gives a notification to a user.

For example, the controlling device 110 controls the bulletin board server 600 to cause the image of FIG. 5 to be displayed. Then, in a case where the user selects "Quiet" on the "Chattiness Option" menu shown in FIG. 5, the number of times the controlling device 110 obtains information per hour can be decreased (e.g. down to 1/10 in frequency etc.). In a case where the user selects "Chatty", the number of times the controlling device 110 obtains information per hour can be increased (e.g. up to 10 times in frequency etc.).

Furthermore, in a case where the user selects "Quiet", the controlling device 110 can determine, by the content of the information obtained, whether or not a notification is to be given to the user. For example, the controlling device 110 can be configured such that, in a case where the information thus obtained is highly urgent information such as information indicative of trouble with a device or information concerning maintenance, the controlling device 110 notifies the user of such information without exception. In addition, the controlling device 110 can be configured such that, in a case where the information obtained is non-essential such as mere weather information, the controlling device 110 does not notify the user of such information. The controlling device 110 can also be configured such that, in a case where the user selects "Chatty", the controlling device 110 notifies the user of all the information obtained.

The controlling device 110 can also be configured such that a varying importance level is assigned to each piece of information or each category of information so that (i) the controlling device 110 causes notification of highly urgent information in a case where the user selects "Quiet" and (ii) the controlling device 110 causes notification of all the information in a case where the user selects "Chatty." In regard to the assignment of importance levels, it is possible that, for example, a low level of importance is assigned to information from an external source whereas a high level of importance is assigned to information concerning controlled devices. In such a case, even the information from the external source can be exceptionally assigned a high level of importance if it is an earthquake report or urgent information. Furthermore, a notification of information assigned a low level of importance (such as weather forecast) can be (i) given to a user once a day in a case where the user selects "Quiet" and (ii) given to the user each time the weather information is updated in a case where the user selects "Chatty."

The controlling device 110 can also be configured to determine, in accordance with time, whether or not to give a notification to a user. For example, the frequency with which to give the user a notification can be decreased (e.g. 1/10 in frequency) between ten o'clock at night and six o'clock in the morning. Note, however, that the controlling device 110 can be configured to give the user a notification regardless of time in a case where the user selects "Chatty."

According to the device controlling system 101 of Embodiment 13, the controlling device 110 is thus capable of changing a notification format such as a language and frequency in/with which a controlled device gives a notification to a user. This allows the user to select a format convenient to the user.

Embodiment 14

As described in some of the embodiments above, according to each of the embodiments described in the present specification, a controlling device 110 is capable of notifying a user of (i) information indicative of trouble with a controlled device and (ii) information concerning a solution to the trouble. Embodiment 14 will be described below with reference to FIG. 6.

Figure 6:
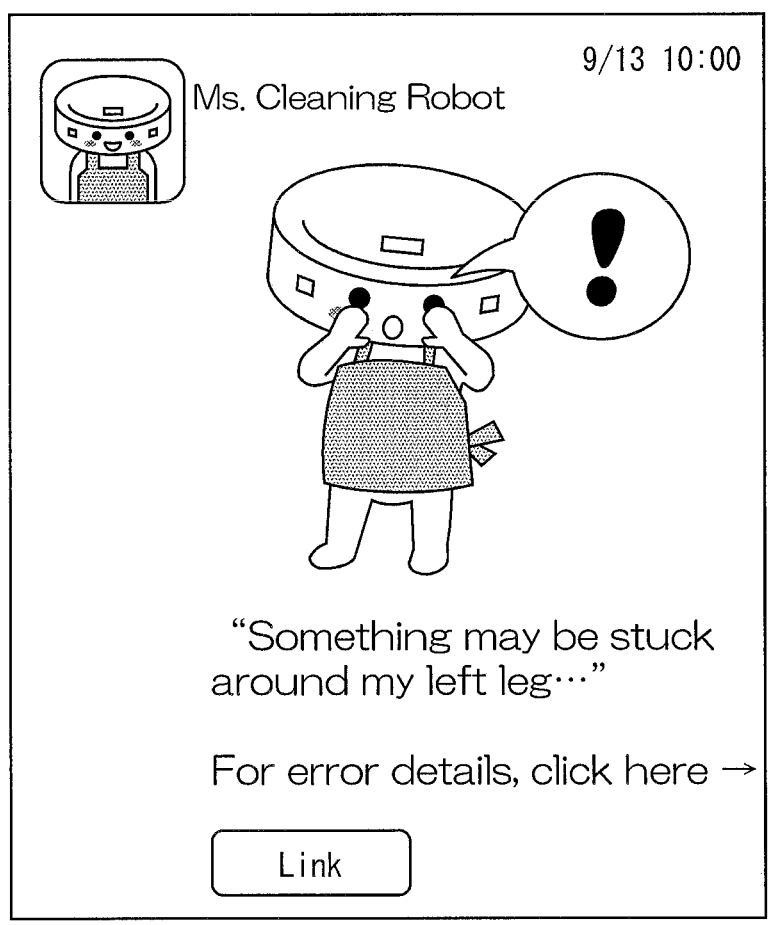
FIG. 6 is a view illustrating a screen (i) which a bulletin board server of a device controlling system in accordance with Embodiment 13 of the present invention causes a device to display and (ii) which shows content submitted by a cleaning robot.

FIG. 6 is a view illustrating a screen on which a content submitted by a cleaning robot is displayed by a bulletin board server 600 of a device controlling system 101 in accordance with Embodiment 14 of the present invention.

First, the cleaning robot supplies, to the controlling device 110, status information indicating that trouble has occurred. The controlling device 110 obtains the status information supplied from the cleaning robot. Then, a master controlling section 113 determines, by referring to the status information thus obtained, a control matter to "controlling a controlled device to notify a user of (i) the occurrence of the trouble with the cleaning robot and (ii) information regarding a solution to the trouble." An example of such a control matter is that, as illustrated in FIG. 6, the bulletin board server 600 displays (i) an image showing that the cleaning robot is expressing "Something may be stuck around my left leg . . . " (indicating that trouble has occurred to the cleaning robot), (ii) text reading "Click here for details of the error", and (iii) the "Link" button (information regarding the solution to the trouble). Alternatively, the controlling device 110 can directly transmit, to the user, the content displayed by the bulletin board server 600.

Alternatively, the master controlling section 113 can first determine a control matter to "controlling a controlled device to notify a user that trouble has occurred to the cleaning robot." Then, the master controlling section 113 can further determine a control matter after obtaining a response of the user to the notification. For example, the controlling device 110 controls a television to output an artificial voice saying "Here is a message from Ms. Cleaning Robot: 'Something may be stuck around my left leg.'" Then, the television supplies, to the controlling device 110, voice information indicating a voice of the user saying "What should I do?" The master controlling section 113 determines, by referring to the voice information thus obtained, a control matter to "controlling a controlled device to verbally notify the user of a specific solution to the trouble."

According to the device controlling system 101 of Embodiment 14, the controlling device 110 is thus capable of notifying a user of (i) trouble occurring to a cleaning robot and (ii) a solution to the trouble.

To be more general, it is possible that (i) the controlling device 110 transmits, to a controlled device, (a) content of which a user is to be notified and (b) a link to detailed information related to the content and (ii) the controlled device displays objects indicative of the content and the link. It is also possible that, in addition to or instead of transmitting the link, the controlling device 110 refers to a voice of the user, and provides, via a controlled device, the user with information that is more detailed than the information described above.

Embodiment 15

A controlling device 110 can be configured to transmit, to any controlled device other than a bulletin board server 600, an object such as text showing notification content. Embodiment 15 will be described below with reference to FIG. 7.

Figure 7:
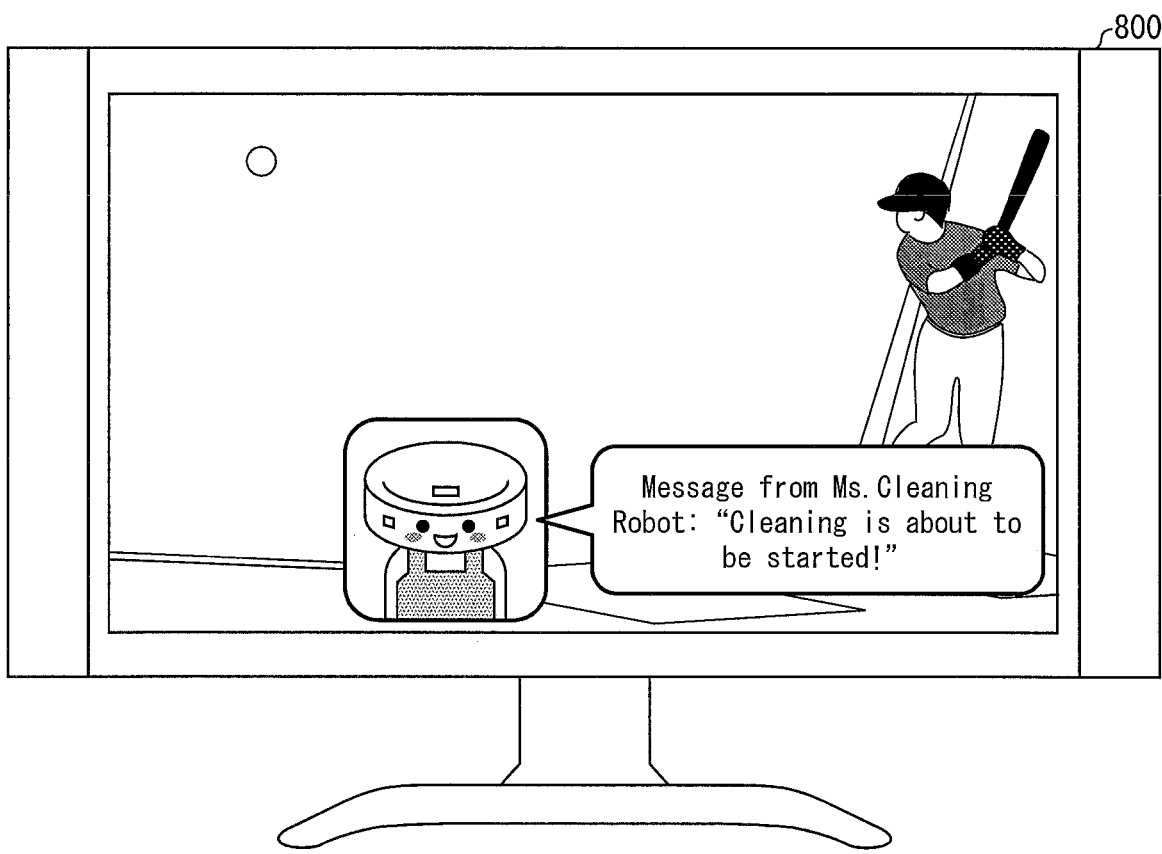
FIG. 7 is a view illustrating a screen displayed by a television of a device controlling system in accordance with Embodiment 15 of the present invention.

FIG. 7 is a view illustrating a screen displayed by a television 800 of a device controlling system 101 in accordance with Embodiment 15 of the present invention.

According to Embodiment 15, for example, a cleaning robot supplies, to the controlling device 110, status information indicating that cleaning is about to be started. The controlling device 110 obtains the status information supplied from the cleaning robot. Then, a master controlling section 113 determines, by referring to the status information thus obtained, a control matter to "controlling a controlled device to notify a user that the cleaning robot is about to start cleaning." Then, the controlling device 110 supplies the control matter to either or both of a bulletin board server 600 and a television 800. An example of the control matter is that, as illustrated in FIG. 7, the television 800 displays (i) an image showing the cleaning robot that is a device from which the status information was supplied and (ii) a text image reading "Here is a message from Ms. Cleaning Robot: Cleaning is about to be started!", such that the image and the text image are superimposed on an image displayed on the television 800.

In so doing, in a case where it is detected that the user is watching the content on the television 800 (e.g. a case where a motion detector included in the television 800 detects that the user is in front of the television), it is unnecessary for the bulletin board server 600 to supply control information.

According to the device controlling system 101 of Embodiment 15, the controlling device 110 is thus capable of (i) controlling the bulletin board server 600 to display the status information of the cleaning robot and (ii) controlling the television 800 to display the status information of the cleaning robot so as to be superimposed on an image on the television 800. This allows the notification content to be more effectively delivered to a user.

Embodiment 16

The following description will discuss specific examples of a method of communication between a controlling device 110 and a controlled device in accordance with each of the embodiments described above.

Example 1

Polling Communication from Controlled Device (Case 1)

According to Example 1, a controlled device makes an inquiry to a controlling device 110, and then the controlling device 110 supplies a control signal to the controlled device in response.

For example, in a case where a controlled device (e.g. cleaning robot) attempts to obtain, from the controlling device 110, information regarding weather forecast, (i) the controlled device makes an inquiry to the controlling device 110, (ii) the controlling device 110, which received the inquiry, obtains the information regarding the weather forecast from a weather information obtaining device, and then (iii) the controlling device 110 supplies the information to the controlled device.

According to Example 1, a controlled device can make an inquiry to the controlling device 110 (i) when information is needed as described above, or (ii) with every predetermined length of period, such as with every one minute or with every ten minutes.

Example 2

Polling Communication from Controlled Device (Case 2)

Example 2 is similar to Example 1 in that a controlled device makes an inquiry to a controlling device 110. According to Example 2, however, the controlled device makes an inquiry to the controlling device 110 (i) immediately after the controlled device receives a control signal from the controlling device 110 or (ii) immediately after a process in accordance with a control signal from the controlling device 110 ends. Then, the controlling device 110, which has received the inquiry, stands by until a next timing with which to supply information to the controlled device.

According to Example 2, the controlling device 110 can supply information to a controlled device with a desired timing. This facilitates a real-time operation.

Example 3

Push Communication from Controlling Device 110

Another example of the method is a method in which a controlling device 110 supplies information to a controlled device by use of push transmission.

Figure 8:
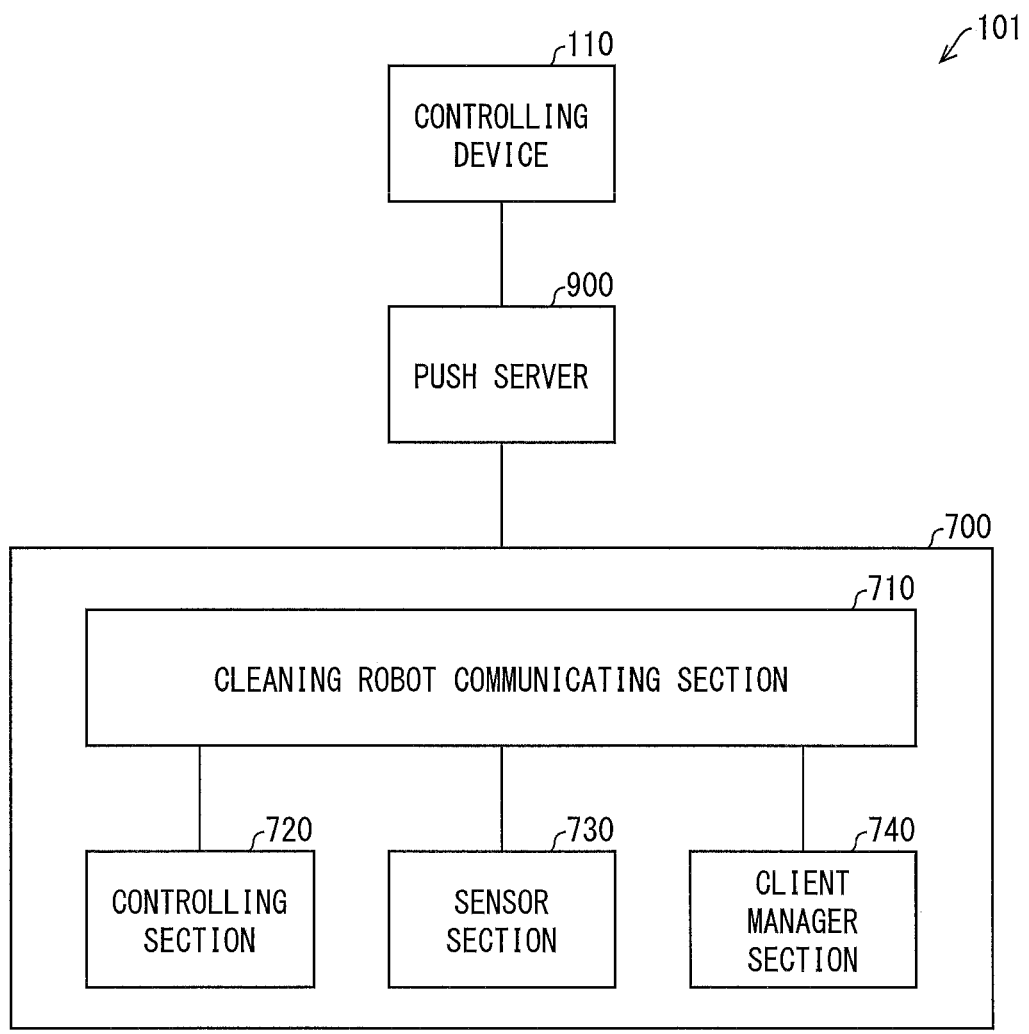
FIG. 8 is a block diagram illustrating a main configuration of a device controlling system that realizes a transmission method of Example 3 of Embodiment 16.

A configuration for realizing the transmission method according to Example 3 will be described below with reference to FIG. 8. FIG. 8 is a block diagram illustrating a main configuration of a device controlling system 101 for realizing the transmission method of Example 3.

As illustrated in FIG. 8, the device controlling system 101 of Example 3 is configured such that a controlling device 110 is connected, via a PUSH server 900, to a cleaning robot 700 which serves as an example of a controlled device. Note that the PUSH server 900 is configured to carry out push communication with a controlled device.

As illustrated in FIG. 8, the cleaning robot 700 includes (i) a cleaning robot communicating section 710, (ii) a controlling section 720, (iii) a sensor section 730, and (iv) a client manager section 740. Note that the cleaning robot communicating section 710, the controlling section 720, and the sensor section 730 are similar to those of the controlled devices described above, and therefore will not be described below. Note also that, although FIG. 8 omits controlled devices other than the cleaning robot 700, Embodiment 16 is not limited to such a configuration. Any controlled device omitted in FIG. 8 can be configured to be connected to the controlling device 110 via the PUSH server, and to include a client manager section.

The client manager section 740 is configured to manage push communication from the PUSH server 900.

According to Example 3, the PUSH communication is enabled by, for example, using WebSocket which is an example of a communications protocol and is intended for bi-directional communication between the PUSH server 900 and the client manager section 740 through an always-on connection.

As has been described, there are more than one option for a specific method of communication between the controlling device 110 and each controlled device. That being said, it is possible, for example, to employ the method of Example 1 for normal operations, and to employ the method of Example 3 as needed.

Alternatively, it is also possible to selectively employ the methods of Example 1 (or Example 2) and Example 3 in accordance with (i) a type of information which a controlling device 110 supplies or (ii) a type of information which a controlled device demands from a controlling device 110. For example, the following configuration is possible: In a case where a cleaning robot attempts to obtain, from a controlling device 110, information regarding weather forecast, polling communication is carried out according to the method of Example 1. In a case where a controlling device 110 is intended to control a washing machine 500 to give a notification "Laundry has been completed", a control signal is supplied by use of the push communication of Example 3.

While the above descriptions discussed the examples in which a voice is used primarily as the means of notification of information, the present invention is not limited to such examples. In fact, it is possible to give a notification by use of a display section or the like. In so doing, it is possible to control a bulletin board server to give a notification of the information.

In addition, while the above descriptions discussed the examples in which a voice is used primarily as the means by which a controlled device obtains information from a user, the present invention is not limited to such examples. In fact, a controlled device can obtain information from a user by the user's input into an operation input section (such as touch panel, remote control, or operating device). In so doing, it is possible to control a bulletin board server to input the information into a controlled device.

Embodiment 17

The control blocks of the controlling device 110 and the controlled devices (solar power generating device 200, air conditioner 300, refrigerator 400, washing machine 500, and bulletin board server 600) (the control blocks being, in particular, the controlling sections 112, the master controlling section 113, and the controlling sections of the controlled devices) may be realized by a logic circuit (hardware) provided in an integrated circuit (IC chip) or the like or may be realized by software as executed by a CPU (Central Processing Unit).

In the latter case, the controlling device 110 and the controlled devices each include: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

Embodiment 18

Figure 10:
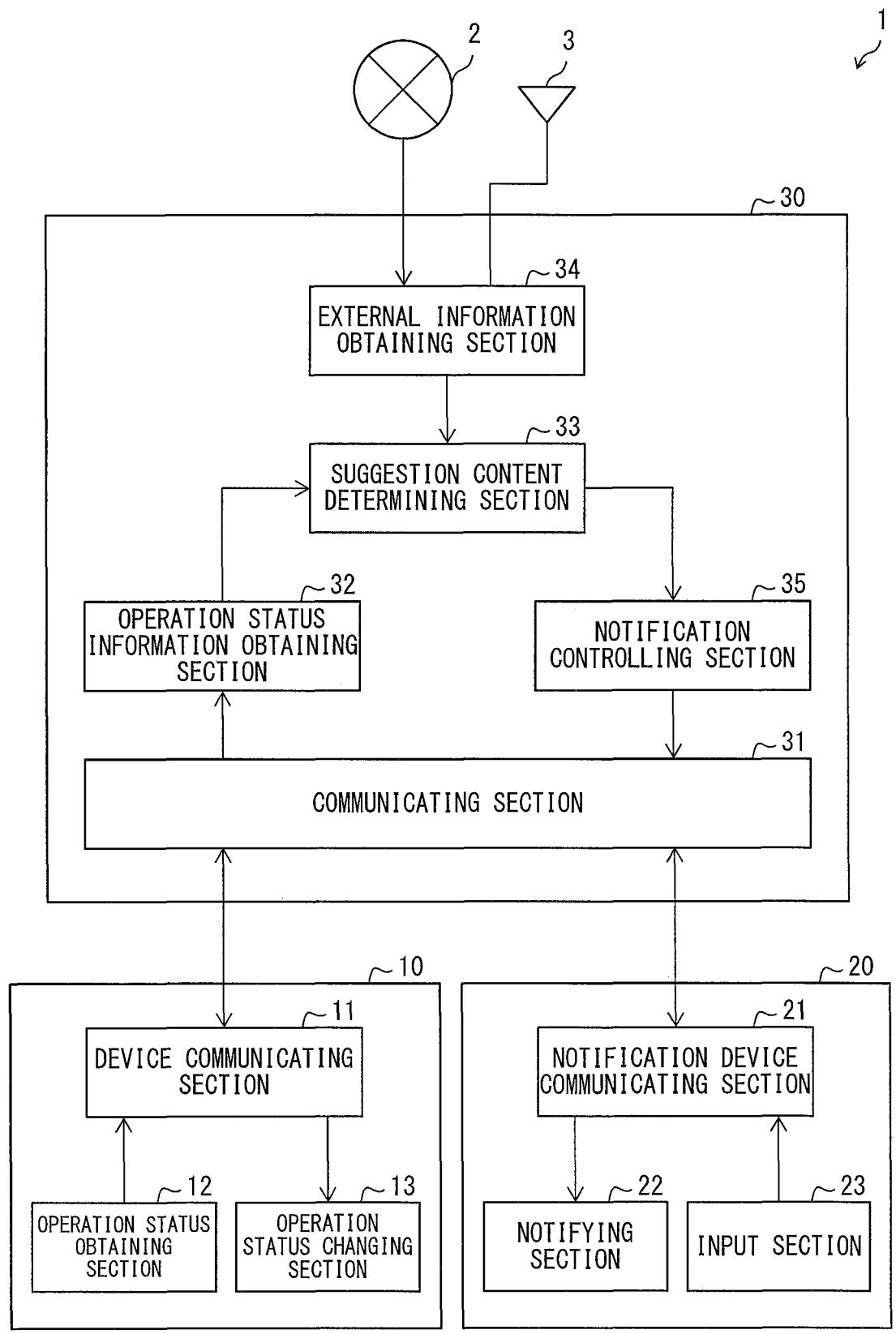
FIG. 10 is a block diagram illustrating a configuration of a device operation suggestion notification system in accordance with Embodiment 18 of the present invention.

FIG. 10 is a block diagram illustrating a configuration of a device operation suggestion notification system 1 in accordance with Embodiment 18 of the present invention. As illustrated in FIG. 10, the device operation suggestion notification system 1 includes (i) an operation target device (first device) 10, (ii) a notification device (second device) 20, and (iii) a controlling device 30. The device operation suggestion notification system 1 is a system for causing the notification device 20 to notify a user of a suggestion concerning an operation of the operation target device 10, which suggestion is based on the status of the operation target device 10 and on external information.

Examples of the operation target device 10 encompass a washing/drying machine, a rice cooker, an air conditioner, and an LED light. The notification device 20 can be any device, provided that the device includes (i) a notifying unit configured to notify a user of information and (ii) an inputting unit configured to receive an operation of the user. Examples of the notification device 20 encompass a mobile device (smartphone) and a television.

(Configuration of Controlling Device 30)

As illustrated in FIG. 10, the controlling device 30 includes (i) a communicating section 31, (ii) an operation status information obtaining section (operation status information obtaining unit) 32, (iii) a suggestion content determining section (suggestion content determining unit) 33, (iv) an external information obtaining section (external information obtaining unit) 34, and (v) a notification controlling section (notification controlling unit) 35.

The communicating section 31 is capable of transmitting/receiving data to/from the operation target device 10 and the notification device 20.

In a case where a predetermined length of time (e.g. 10 minutes) passes, the operation status information obtaining section 32 is capable of (i) causing the operation target device 10 to supply operation status information indicative of an operation status of the operation target device 10 and (ii) obtaining the operation status information via the communicating section 31. The operation status information obtaining section 32 is also capable of obtaining operation status information supplied, with any timing, from operation target device 10. Examples of the operation status information encompass information indicative of (i) whether or not the operation target device 10 is in operation, (ii) what type of operation is being carried out if the operation target device 10 is in operation, (iii) setting information of the operation target device 10 (e.g. (a) whether a dryer setting of a washing/drying machine is turned on, (b) whether a timer of an air conditioner is turned on, and (c) time to which the timer is set), (iv) sensing information obtained by a sensor section (not illustrated) included in the operation target device 10 (e.g. (a) air temperature of a room detected by a temperature sensor of an air conditioner and (b) information indicative of the presence of a person detected by a motion detector), and (v) instructional information indicative of an operation which the operation target device 10 has received from a user (e.g. (a) information indicating that a dryer setting of a washing/drying machine is turned on and (b) information indicating that a timer of an air conditioner is turned on).

The external information obtaining section 34 is capable of obtaining data from a network 2 and obtaining data from an antenna 3 via broadcast waves. Data obtained by the external information obtaining section 34 will be referred to as external information. External information can also be information obtained by any device except for the operation target device 10. The external information obtaining section can be configured to, for example, obtain external information with every predetermined length of time (e.g. 10 minutes). In particular, the external information obtaining section 34 can be configured to (i) periodically monitor whether or not external information, which is received via the network 2 or the antenna 3, is updated and (ii) obtain the external information every time the external information is updated. Examples of the external information encompass (i) electric power consumption information (e.g. (a) information from an electric power plant, the information indicating that electric power consumption will reach an urgent level around 14:00 and (b) information regarding electric power consumption at home, such as that indicating that electricity charges for the month is 8,000 yen), (ii) advertisement information of a grocery store (e.g. information indicating that a time-limited sale will begin at 15:00), and (iii) air temperature information (e.g. (a) air temperatures of various locations according to weather forecast and (b) a temperature detected by a thermometer located outside home).

The suggestion content determining section 33 determines suggestion content of which the notification device is to notify a user, the suggestion content being determined based on the operation status information of the operation target device 10 and on the external information. The suggestion content is not limited to a suggestion concerning an operation of the operation target device 10, but can be a suggestion concerning what action a user should take. In addition, the suggestion content can include (i) an operation status of the operation target device 10, (ii) a result of changing the operation status of the operation target device 10, (iii) device information indicative of what device an operation target device 10 is. Note that each of these will be described below later an example. Note also that the process in which the suggestion content determining section 33 determines suggestion content will be described later in detail.

The notification controlling section 35 is capable of causing, via the communicating section 31, the notification device 20 to output the suggestion content. In a case where there a plurality of notification devices 20, the notification controlling section 35 is capable of determining (i) which notification device is to output a notification and (ii) a method by which the notification device is to output the notification. The method will be described later in detail.

(Configuration Notification Device 20)

As illustrated in FIG. 10, the notification device 20 includes a notification device communicating section (suggestion content receiving unit) 21, a notifying section (notifying unit) 22, and an input section (operation receiving unit) 23.

The notification device communicating section 21 is capable of transmitting/receiving data to/from the controlling device 30.

The notifying section 22 (i) obtains, via the notification device communicating section 21, suggestion content to be suggested to a user and then (ii) notifies the user of the suggestion content thus obtained.

The input section 23 obtains, as an operation signal, an input of the user. An input of a user will be described later in detail.

The notification device 20 can be a message board server indicative of suggestion content. Note that the message board server can be configured to (i) assign an ID to the operation target device 10 and (ii) manage, by use of the ID, a process of the operation target device 10 submitting the suggestion content. In addition, the message board server can be configured to (i) cause a message board to display instructional information which is inputted by a user and which concerns an operation of the operation target device 10 and (ii) supply, to the operation target device 10, an operation signal which instructs that the operation indicated by the instructional information be carried out.

(Configuration of Operation Target Device 10)

As illustrated in FIG. 10, the operation target device 10 includes a device communicating section 11, an operation status obtaining section 12, and an operation status changing section 13.

The device communicating section 11 is capable of transmitting/receiving data to/from the controlling device 30.

The operation status obtaining section 12 is capable of (i) obtaining operation status information concerning the operation target device 10 and (ii) transmitting the operation status information to the controlling device 30 via the device communicating section 11. The operation status obtaining section 12 can obtain the operation status information in response to an instruction from the controlling device 30 or obtain the operation status information with any timing (e.g. when the operation status changes).

The operation status changing section 13 obtains an operation signal for changing the operation status of the operation target device 10, and, in accordance with the operation signal, causes a change in the operation status of the operation target device 10.

(Overview of Device Operation Suggestion Notification System 1)

Figure 11:
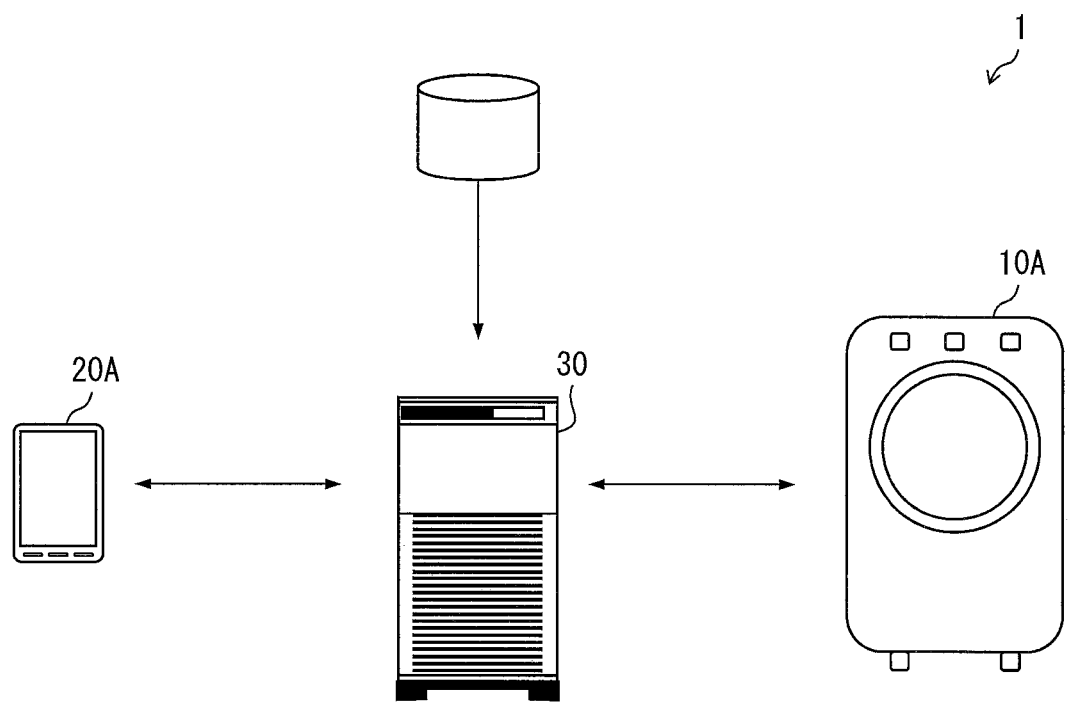
FIG. 11 is a schematic diagram illustrating an overview of the device operation suggestion notification system in accordance with Embodiment 18 of the present invention.

FIG. 11 is a schematic diagram illustrating an overview of the device operation suggestion notification system 1 in accordance with Embodiment 18 of the present invention. As illustrated in FIG. 11, according to Embodiment 18, the operation target device 10 and the notification device 20 are a washing/drying machine 10A and a smartphone 20A, respectively. The operation status information obtained by the controlling device 30 indicates (i) whether or not the washing/drying machine 10A is running a washing cycle and (ii) whether or not a dryer setting is set. In addition, according to Embodiment 18, external information is weather forecast obtained from the network 2 (more specifically, weather forecast concerning an area including where the washing/drying machine 10A is located).

(Process of Controlling Device 30)

Figure 12:
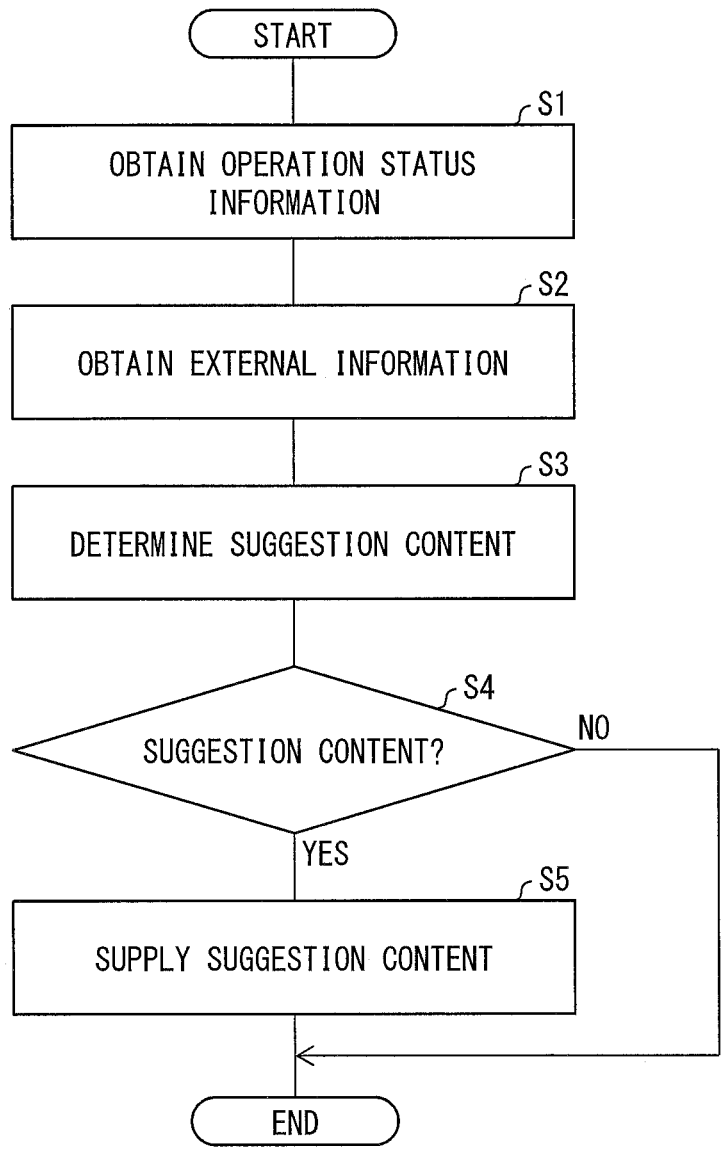
FIG. 12 is a flow chart illustrating a flow of a process of a controlling device of the device operation suggestion notification system in accordance with Embodiment 18 of the present invention.

FIG. 12 is a flow chart illustrating a flow of a process of the controlling device 30 of the device operation suggestion notification system 1 in accordance with Embodiment 18 of the present invention. The flow of the process of the controlling device 30 will be described below with reference to FIG. 12.

First, the operation status information obtaining section obtains operation status information from the washing/drying machine 10A via the communicating section 31 (Step S1, operation status information obtaining step). Then, the operation status information obtaining section 32 supplies the operation status information to the suggestion content determining section 33.

Then, the external information obtaining section 34 obtains external information from the network 2 (Step S2, external information obtaining step). Then, the external information obtaining section 34 supplies the external information to the suggestion content determining section 33.

Then, the suggestion content determining section 33 determines, based on the operation status and the external information thus obtained, suggestion content of which the smartphone 20 will notify a user (Step S3, suggestion content determining step).

Then, the notification controlling section 35 determines whether or not suggestion content exists (Step S4). An example of a process of determining whether or not suggestion content exists is that, when obtaining suggestion content from the suggestion content determining section 33, the notification controlling section 35 determines that suggestion content exists.

In a case where it is determined in the step S4 that "suggestion content exists" (Step S4: YES), the notification controlling section 35 (i) supplies, to the smartphone 20A via the communicating section 31, the suggestion content thus obtained (Step S5, notification controlling step) and (ii) causes the smartphone 20A to notify a user of the suggestion content.

In contrast, in a case where it is determined in the step S4 that "suggestion content does not exist" (Step S4: No), the process shown in FIG. 12 ends.

(Details of Process of Determining Suggestion Content)

FIG. 13 is a table illustrating suggestion content determined by the suggestion content determining section 33 in the device operation suggestion notification system 1 in accordance with Embodiment 18 of the present invention. Examples of a timing with which the suggestion content determining section 33 initiates the process of determining the suggestion content encompass (1) when the washing/drying machine 10A ends a washing cycle, (2) weather forecast, which is external information, is updated, and (3) when a predetermined length of time has passed.

Assume a case where the suggestion content determining section 33 obtains, during the washing cycle of the washing/drying machine 10A, operation status information indicating that a dryer setting is not set (see FIG. 13). In this case, if the weather forecast which is external information indicates fine weather, then the suggestion content determining section 33 does not generate suggestion content. On the other hand, if the weather forecast indicates rainy weather, then the suggestion content determining section 33 determines the use of a dryer function as suggestion content. That is, in a case where the dryer setting of the washing/drying machine 10A is not set, if the weather forecast indicates fine weather, then laundry can be hung outside. This causes the suggestion content determining section 33 not to make any suggestion to a user. If the weather forecast indicates rainy weather, then the laundry cannot be hung outside. This causes the suggestion content determining section 33 to suggest that the user use the dryer function.

Assume a case where the suggestion content determining section 33 obtains, during the washing cycle of the washing/drying machine 10A, operation status information indicating that a dryer setting is set. In this case, if the weather forecast which is external information indicates fine weather, then the suggestion content determining section 33 determines cancellation of the use of the dryer function as suggestion content. On the other hand, if the weather forecast indicates rainy weather, then the suggestion content determining section 33 does not generate suggestion content. That is, in a case where the dryer setting of the washing/drying machine 10A is set, if the weather forecast indicates fine weather, then laundry can be hung outside. This causes the suggestion content determining section 33 to suggest that a user not use the dryer function. If the weather forecast indicates rainy weather, then the laundry cannot be hung outside. This causes the suggestion content determining section 33 not to make any suggestion to the user.

According to the device operation suggestion notification system 1 of Embodiment 18, by referring to operation status information and weather forecast obtained from the washing/drying machine 10A and the network 2, respectively, the controlling device 30 causes the smartphone 20A to notify a user of a suggestion for the use of the dryer function or a suggestion against the use of the dryer function. This allows the device operation suggestion notification system 1 to offer a suggestion concerning an operation of a device, which suggestion is more appropriate than is the case of a conventional technology.

(Notification Method and Operation Method)

It is the notification controlling section 35 that determines a method by which a notification of suggestion content is given. According to Embodiment 18, (i) the smartphone 20A executes an application that uses the device operation suggestion notification system 1 and (ii) the notification controlling section 35 gives a notification of suggestion content by use of the application. More specifically, examples of the notification method encompass (i) a method in which a screen displays the suggestion content, (ii) a method in which the suggestion content is outputted as a sound, and (iii) a method in which the smartphone 20A vibrates. The notification controlling section 35 can notify a user of the suggestion content by use of any one of these methods.

According to the device operation suggestion notification system 1, in a case where there are a plurality of notification devices 20, the notification controlling section 35 determines which notification device 20 is to output a notification. As an example of how to determine which notification device is to output a notification, the notification controlling section 35 can select, as a notification device 20, the smartphone 20A which is carried around by the user on a daily basis.

Alternatively, the notification controlling section 35 can select, as a notification device 20, a device located in the vicinity of the user. In such a case, the controlling device 30 can (i) include an obtaining section (not illustrated) for obtaining, from the notification device 20, information indicative of whether or not the user is located in the vicinity of the notification device 20 and (ii) cause the notification controlling section 35 to refer to the information obtained by the obtaining section, so as to determine whether or not the notification device 20 is located in the vicinity of the user. The information to be obtained by the obtaining section is, for example, a signal indicating that a sensor, which is provided on a door of a refrigerator and which detects that the door is opened, has detected that the door of the refrigerator is being opened. In a case where the obtaining section obtains (as the information) a signal indicating that the door of the refrigerator is opened, the notification controlling section 35 can select the refrigerator as a notification device. Alternatively, in a case where (i) a motion detector, which detects the presence of a person, is provided at a front part of a rice cooker and (ii) the obtaining section obtains a signal indicating that the motion detector has detected that a person is present in the vicinity of the rice cooker, the notification controlling section 35 can select the rice cooker as a notification device. Alternatively, in a case where (i) the above described smartphone includes a sensor for determining whether or not the user is holding the smartphone and (ii) the obtaining section obtains a signal indicating that the sensor has detected that the user is holding the smartphone, the notification controlling section 35 can select the smartphone as a notification device.

Alternatively, on the assumption that the user always carries around the smartphone, the notification controlling section 35 can always select the smartphone as a notification device in addition to a notification device which has been determined as a device located in the vicinity of the user. Alternatively, as an exception to the case where the smartphone is always selected as a notification device, the following can be conceived: For example, in the case where the obtaining section obtains the signal indicating that the door of the refrigerator is opened, the notification controlling section 35 can (i) determine that the user is located in the vicinity of the refrigerator and (ii) select only the refrigerator as a notification device. Alternatively, in a case where the smartphone is unable to obtain suggestion content (e.g. in a case where the smartphone is set in a mode to restrict predetermined communication) or is unable to give a notification of suggestion content (e.g. in a case where the smartphone is set in a mode in which sound output, vibration, and image display are restricted), the notification controlling section 35 does not need to select the smartphone as a notification device.

Alternatively, the notification controlling section 35 can select, as a notification device 20, a device that is being operated by the user. In such a case, the notification device 20, when operated, can supply, to the controlling device 30, information indicating that the user is located in the vicinity of the notification device 20. Then, the obtaining section of the controlling device 30 can obtain the information. Note that what is meant by the phrase "when operated" also encompass a case where the device has received an operation of the user during a predetermined length of period (e.g. one minute, five minutes, or the like) in the immediate past up to the present moment.

Alternatively, the notification controlling section 35 can also select, as a notification device 20, a device that is turned on. In such a case, when turned on, the notification device 20 can supply, to the controlling device 30, information indicating that the notification device 20 is turned on. Then, a notification device power status obtaining section (not illustrated) of the controlling device 30 can obtain the information.

Alternatively, the notification controlling section 35 can select, as a notification device 20, device that is solely designated as a notification device. For example, the notification controlling section 35 can select, as a notification device 20, (i) a device which is solely designated as a notification device and which is provided where people gather together or (ii) a device which is solely designated as a notification device and which is provided at a spot on each floor where the user can easily notice the device.

Alternatively, the notification device 20 and the operation target device 10 can be the same device. For example, in a case where the washing/drying machine 10A of Embodiment 18 includes a motion detector and where the obtaining section obtains (from the washing/drying machine 10A) operation status information indicating that the motion detector has detected the presence of a person, the notification controlling section 35 can control the washing/drying machine 10A as a notification device 20.

Alternatively, the notification device 20 can notify the user of suggestion content as well as receive an input of the user which input indicates whether or not the user accepts the suggestion content.

FIG. 14 illustrates (i) types of notification devices of the present invention, (ii) methods by which the respective notification devices give notifications, and (iii) methods by which the respective notification devices receive operation content.

(a) of FIG. 14 is a table illustrating the methods by which notification devices of the present invention give notifications of suggestion content. (b) of FIG. 14 is a table illustrating the methods by which the notification devices of the present invention receive operation content.

As illustrated in (a) and (b) of FIG. 14, the methods of giving a notification of suggestion content and the methods of receiving suggestion content vary, depending on a notification device used. Examples of the method of giving a notification of suggestion content encompass methods that employ display, sound, and other means. The method employing display is carried out such that a display section of a notification device displays suggestion content in the form of text. The method employing a sound is carried out such that an audio output section of a notification device outputs an artificial voice indicative of suggestion content. The methods employing other means vary, depending on a device used. For example, in (a) of FIG. 14, in a case where the method employing other means is used by a cleaning robot, the cleaning robot gives a notification of suggestion content by dance movements. In a case where the method employing other means is used by a smartphone, the smartphone gives a notification of suggestion content by vibration. In addition, in a case where the method employing other means is used by a gaming device, the gaming device gives a notification of suggestion content by, for example, vibrating a controller that receives an operation of the user. Note that, in (a) of FIG. 14, (i) the smartphone can mean any mobile device other than a smartphone and (ii) the gaming device is herein assumed to be primarily a gaming device to be used while being connected to a television.

In a case where (i) operation status information is obtained from an air conditioner which is an operation target device the operation status information indicating that the air conditioner is running a cooling operation and (ii) external information, which indicates that outside air temperature is 25° C., is obtained, a notification of suggestion content can be given by outputting a sound. The following are four examples of such a case:

(1) The air conditioner outputs an artificial voice saying "Since outside air temperature is 25° C., it is better to turn off the cooling operation of the air conditioner." (2) The air conditioner outputs an artificial voice saying "Though outside air temperature is 25° C., the cooling operation of the air conditioner is still running." (3) The air conditioner outputs an artificial voice saying "Since outside air temperature is 25° C., the cooling operation of the air conditioner has been turned off and the windows have been opened. (4) The air conditioner outputs an artificial voice saying "Since outside air temperature is 25° C., the cooling operation of the air conditioner will be turned off in 3 minutes."

In the case of the example (1), the suggestion content determining section 33 determines suggestion content to suggest that it is better for the user to turn off the cooling operation of the air conditioner. In the case of the example (2), the suggestion content determining section 33 determines that suggestion content is a suggestion to the effect that it is better for the user to turn off the cooling operation of the air conditioner (in other words, the suggestion implies that the cooling operation should be turned off). In the case of the example (3), the suggestion content determining section 33 determines that suggestion content (a) includes the results that the air conditioner 10 which is the operation target device has been turned off and that the windows have been opened and (b) prompts the user to indicate whether or not the user accepts these results. In the case of the example (4), the suggestion content determining section 33 determines that suggestion content prompts the user to indicate whether or not the user accepts a suggestion for how the air conditioner 10 will be controlled.

Examples of the method by which a notification device receives the user's indication of whether or not to accept the suggestion content encompass methods that employ screen (touch panel), voice, gesture, remote control, and operating device. The method employing a screen (touch panel) is carried out such that (i) the screen displays an indication prompting whether or not the user accepts the suggestion content and then (ii) the user directly operates the screen (touch panel) of the notification device. The method employing a voice is carried out such that the user inputs, with a voice, an indication of whether or not the user accepts the suggestion content. The method employing a gesture is carried out such that the user inputs, by gesture, an indication of whether or not the user accepts the suggestion content. For example, assume a case where a television is used. In a case where an image obtaining section of the television detects such a gesture of the user as pointing one finger upwards, it can be determined that the suggestion content is accepted. In a case where the image obtaining section detects such a gesture of the user as pointing two fingers upwards, it can be determined that the suggestion content is not denied. The method employing a remote control is carried out such that the user operates a device (remote control) that enables a remote operation of the notification device. The method employing an operating device is carried out such that the user directly operates a hardware switch such as a button, a key, or a knob.

Alternatively, in a case where the user accepts the suggestion content, the notification device can receive a detailed operation concerning the suggestion content. For example, in a case where the notification device is a smartphone, the smartphone displays suggestion content that suggests the use of a dryer function of a washing/drying machine. Then, in a case where the user provides a further input (i.e. input such as an indication of acceptance of the suggestion content), the smartphone can display an operation screen for remote control of the washing machine. More preferably, the smartphone can, for example, display a screen such as a screen that prompts the user to input a length of time for which the dryer function is to be used or a screen that prompts the user to input a temperature at which the drying cycle is carried out, so that the smartphone receives a more detailed operation concerning such suggestion content as using the dryer function. In this case, the more detailed operation can be limited to an operation that only concerns the suggestion content. For example, in a case where the notification device suggests the use of the dryer function, the notification device can prevent the user from making an input to cause the washing/drying machine to re-run a washer function. The notification device can do so by (i) denying the input of the user or (ii) not displaying a screen that allows the user to choose to cause the washing/drying machine to run the washer function. This prevents, for example, the user from making an operational error such as restarting the washer function instead of starting the dryer function while the user actually intends to use the dryer function.

(Another Example of Configuration of Controlling Device 30)

Figure 15:
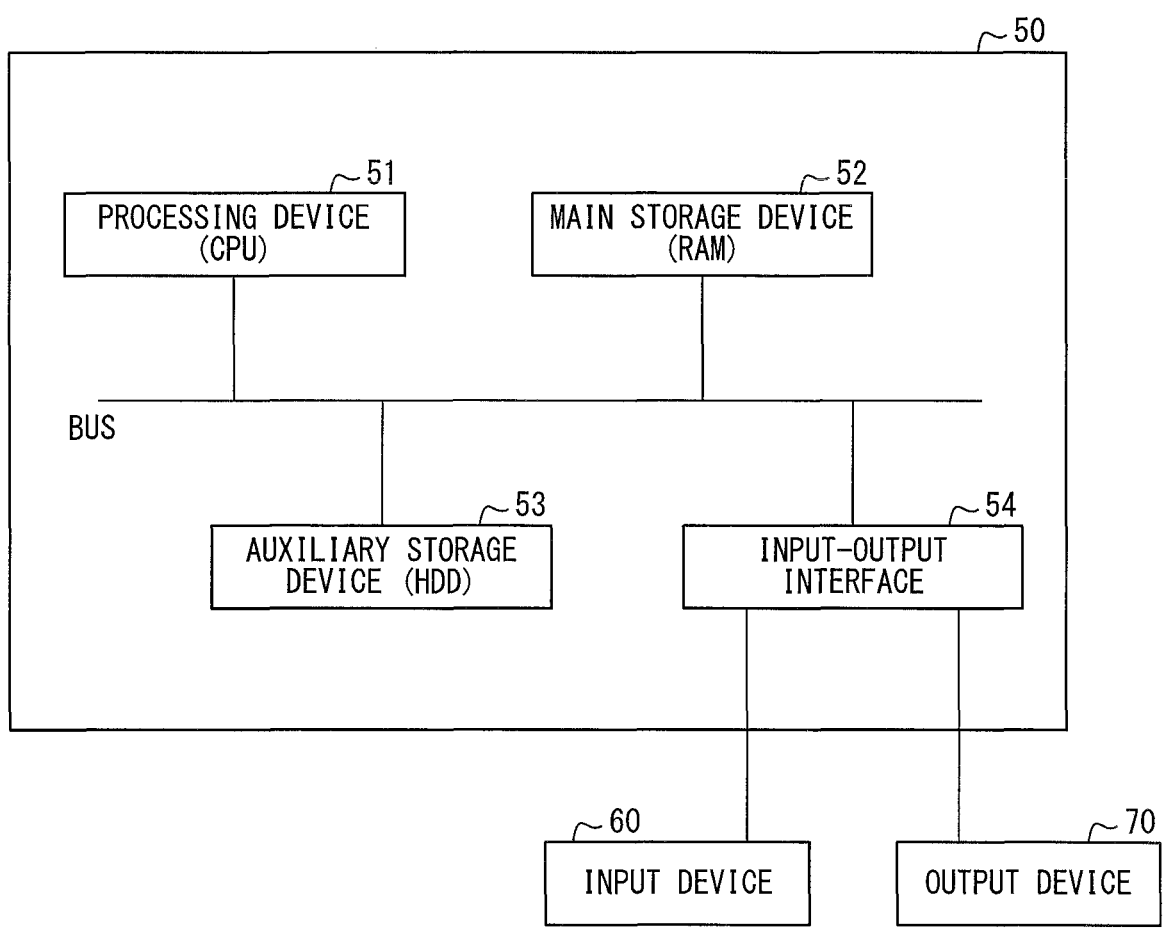
FIG. 15 is a block diagram illustrating a configuration of a computer which can be used as the controlling device in accordance with Embodiment 18 of the present invention.

FIG. 15 is a block diagram illustrating a configuration of a computer 50 which can be used as a controlling device 30 in accordance with Embodiment 18 of the present invention.

As illustrated in FIG. 15, the computer 50 includes a processing device 51, a main storage device 52, an auxiliary storage device 53, and an input-output interface 54, which are connected to one another via buses. An example of a device usable as the processing device 51 is a CPU (Central Processing Unit). An example of a device usable as the main storage device 52 is a semiconductor RAM (random access memory). An example of a device usable as the auxiliary storage device 53 is a hard disk drive.

To the input-output interface 54, an input device 60 and an output device 70 are connected (see FIG. 15). The input device 60 corresponds to the operation target device 10 described above. The output device 70 is intended to notify a user of suggestion content. The notification device 20 can be used as the output device 70.

The auxiliary storage device 53 stores a control program for causing the computer 50 to operate as the controlling device 30. The control program is intended for realizing the functions of the above-described operation status information obtaining section 32, the suggestion content determining section 33, the external information obtaining section 34, the notification controlling section 35, and the like.

The processing device 51 causes the computer 50 to serve as the controlling device 30 by executing instructions contained in the control program loaded on the main storage device 52. More specifically, by executing the instructions contained in the control program, the processing device 51 causes the computer 50 to serve as each of the operation status information obtaining section 32, the suggestion content determining section 33, the external information obtaining section 34, and the notification controlling section 35.

(Hardware Configuration of Notification Device 20)

Figure 21:
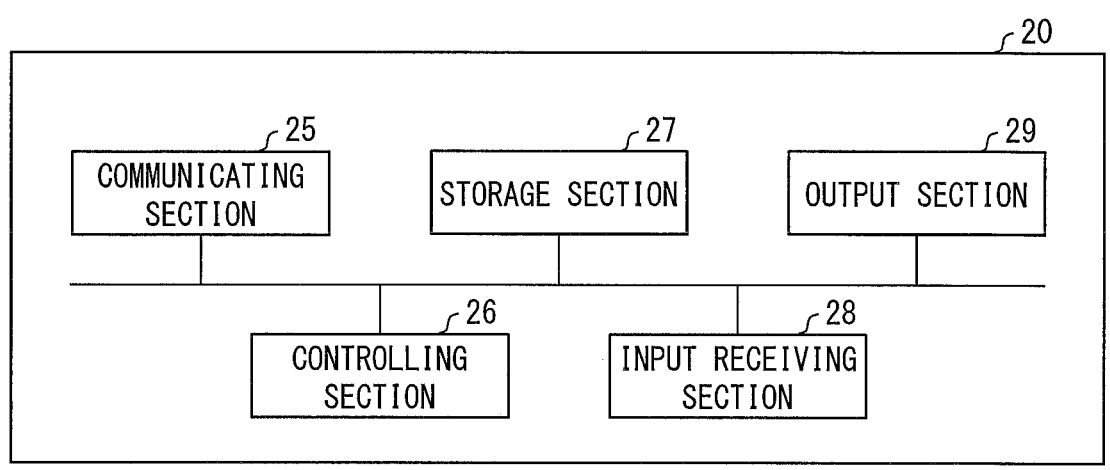
FIG. 21 is a block diagram illustrating a hardware configuration of a notification device in accordance with Embodiment 18 of the present invention.

FIG. 21 is a block diagram illustrating a hardware configuration of the notification device 20 in accordance with Embodiment 18 of the present invention. As illustrated in FIG. 21, the notification device 20 includes a communicating section 25, a controlling section 26, a storage section 27, an input receiving section 28, and an output section 29.

The communicating section 25 is an interface that enables communication with an external device. The communicating section 25 realizes the function of the notification device communicating section 21 described above.

The storage section 27 includes a main storage section and an auxiliary storage section. An example of a device usable as the main storage section is a semiconductor RAM. An example of a device usable as the auxiliary storage section is a hard disk drive. The auxiliary storage section stores a control program for causing the notification device 20 to serve its function. The control program is intended for realizing the functions of the notifying section 22 and the input section 23.

The controlling section 26 realizes the functions of the notifying section 22 and the input section 23 by (i) loading the control program on the main storage section of the storage section 27 and (ii) executing instructions contained in the control program thus loaded. An example of a device usable as the controlling section 26 is a CPU (Central Processing Unit).

The input receiving section 28 receives an input of the user. Examples of the input receiving section 28 encompass a switch, a button, and a touch panel. The input receiving section 28 outputs, as an operation signal, the input of the user thus received.

The output section 29 outputs suggestion content of which the notifying section 22 notifies the user. Examples of the output section 29 encompass speakers and display devices such as an LCD (Liquid Crystal Display), a PDP (Plasma Display Panel), and an EL (Electroluminescence) display.

Embodiment 19

Figure 16:
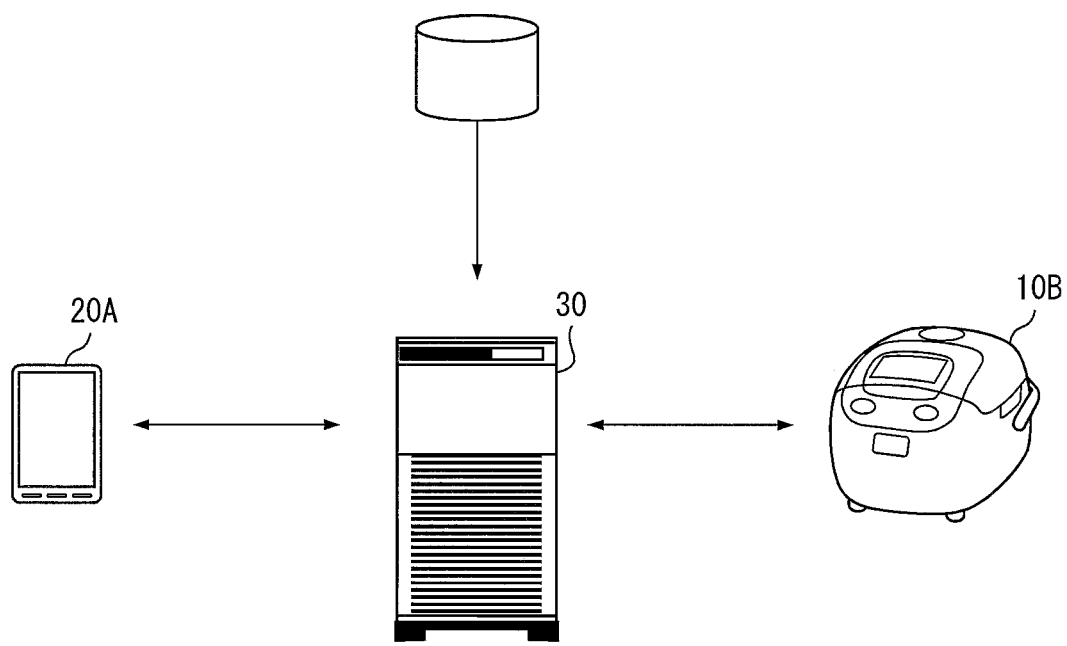
FIG. 16 is a schematic diagram illustrating an overview of a device operation suggestion notification system in accordance with Embodiment 19 of the present invention.
Figure 17:
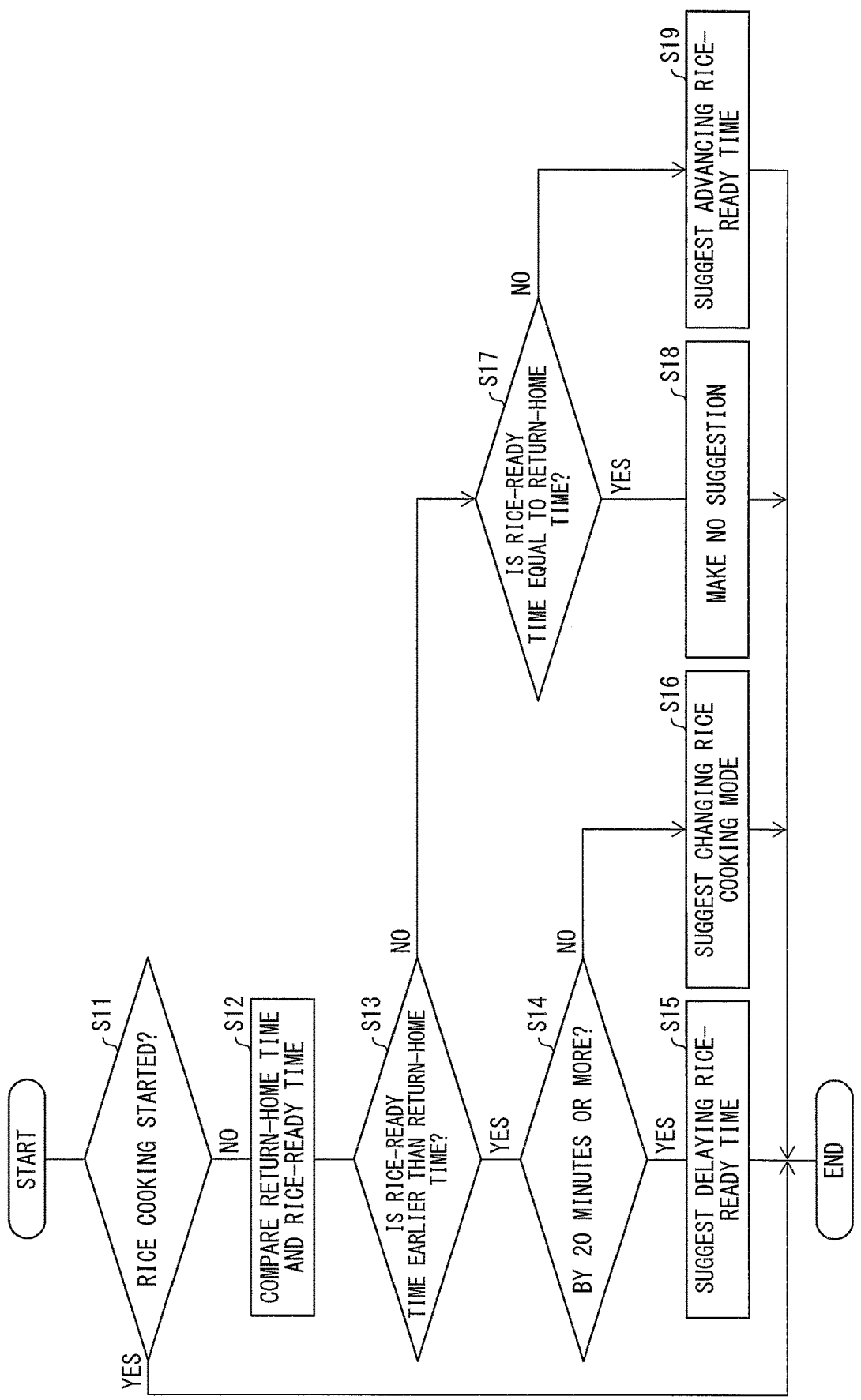
FIG. 17 is a flow chart illustrating a flow of a process in which a suggestion content determining section of the device operation suggestion notification system in accordance with Embodiment 19 of the present invention determines suggestion content.

The following description will discuss another embodiment of the present invention with reference to FIGS. 16 and 17. Note that, for convenience, members identical in function to those described in the above embodiments will be given the same reference signs, and their descriptions will be omitted.

FIG. 16 is a schematic diagram illustrating an overview of a device operation suggestion notification system 1 in accordance with Embodiment 19 of the present invention. As illustrated in FIG. 16, according to Embodiment 19, an operation target device 10 and a notification device 20 are a rice cooker 10B and a smartphone 20A, respectively. Operation status information to be obtained by a controlling device 30 is (i) information indicative of whether or not the rice cooker 10B is in the process of cooking rice and (ii) rice-ready time at which cooking of the rice is set to be completed and which is set by a timer. External information is estimated return-home time at which a user is expected to return home, which estimated return-home time is obtained from the network 2. Note that the user can notify, via the network 2, the controlling device 30 of the estimated return-home time. However, a method by which the controlling device 30 learns the estimated return-home time is not limited to such an example, but can be a method in which, for example, the controlling device 30 obtains the current time and a location of a smartphone being carried by the user, so as to calculate time at which the user is returning home. Alternatively, the estimated return-home time can be, without being managed by the controlling device 30, obtained from (i) a schedule management service existing on the network 2 or (ii) navigation service that calculates a length of time it takes to get to a destination from a current location.

(Details of Process of Determining Suggestion Content)

FIG. 17 is a flow chart illustrating a flow of a process in which the suggestion content determining section 33 of the device operation suggestion notification system 1 in accordance with Embodiment 19 of the present invention determines suggestion content. Examples of a timing with which the suggestion content determining section 33 starts the process of determining the suggestion content encompass (1) when the user changes estimated return-home time at which to return home and (2) when a predetermined length of time has passed.

First, the suggestion content determining section 33 determines, in accordance with operation status information obtained, whether or not the rice cooker 10B has started cooking rice (Step S11).

In a case where it is determined in the step S11 that "the rice cooker 10B has started cooking rice" (Step S11: YES), the process shown in FIG. 17 ends because the operation status of the rice cooker 10B cannot be changed.

On the other hand, in a case where it is determined in the step S11 that "the rice cooker 10B has not started cooking rice" (Step S11: NO), the suggestion content determining section 33 compares estimated return-home time and rice-ready time, which have been obtained (Step S12). Then, the suggestion content determining section 33 determines whether or not the rice-ready time is earlier than the estimated return-home time (Step S13).

In a case where it is determined in the step S13 that "the rice-ready time is earlier than the estimated return-home time" (Step S13: YES), the suggestion content determining section 33 determines whether or not the rice-ready time is earlier than the estimated return-home time by 20 minutes or more (Step S14).

In a case where it is determined in the step S14 that "the rice-ready time is earlier than the estimated return-home time by 20 minutes or more" (Step S14: YES), the suggestion content determining section 33 determines that suggestion content suggests delaying the rice-ready time so that the user will be able to have rice that will have been cooked immediately before (Step S15).

On the other hand, in a case where it is determined in the step S14 that "the rice-ready time is earlier than the estimated return-home time by less than 20 minutes" (Step S14: NO), the suggestion content determining section 33 determines that the suggestion content suggests changing a cooking mode to a mode that allows rice to be cooked in a more flavorful way although such a mode requires more time (Step S16). This is because, in the case where the rice-ready time is earlier than the estimated return-home time by less than 20 minutes, (although the user will be able to have rice that will have been cooked immediately before) there is a little time available.

In a case where it is determined in the step S13 that "the rice-ready time is not earlier than the estimated return-home time" (Step S13: NO), the suggestion content determining section 33 determines whether or not the rice-ready time matches the estimated return-home time (Step S17).

In a case where it is determined in the step S17 that "the rice-ready time matches the estimated return-home time" (Step S17: YES), the suggestion content determining section 33 does not generate any suggestion content because the user will be able to have rice that will have been cooked immediately before.

In a case where it is determined in the step S17 that "the rice-ready time does not match the estimated return-home time" (Step S17: NO), the suggestion content determining section 33 determines that the suggestion content suggests advancing the rice-ready time (Step S19). This is because the rice will otherwise not be ready when the user returns home.

By referring to the operation status information and the estimated return-home time obtained from the rice cooker 10B and the network 2, respectively, the device operation suggestion notification system 1 of Embodiment 19 thus causes the smartphone 20A to notify the user of a suggestion for changing the rice-ready time or a suggestion for changing the cooking mode. This allows the device operation suggestion notification system 1 to offer a suggestion concerning an operation of a device, which suggestion is more appropriate than is the case of a conventional technology.

Embodiment 20

Figure 18:
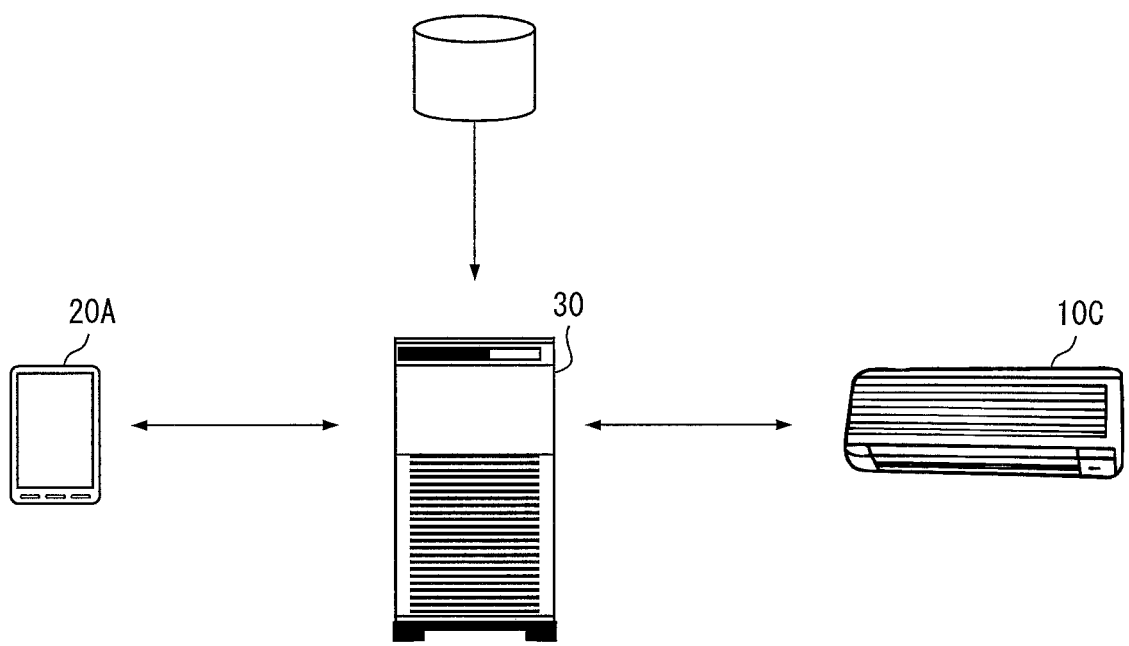
FIG. 18 is a schematic diagram illustrating an overview of a device operation suggestion notification system in accordance with Embodiment 20 of the present invention.
Figure 19:
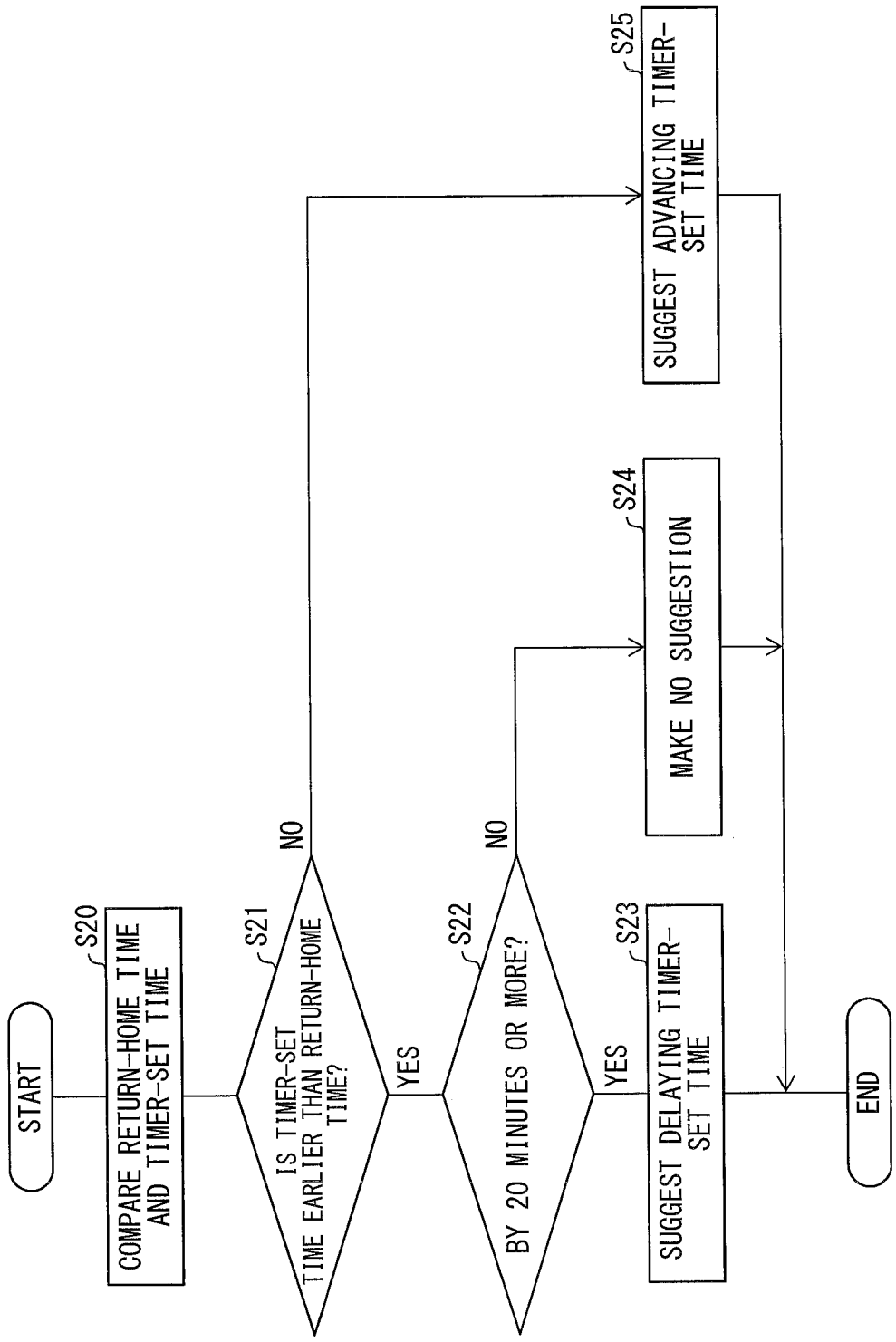
FIG. 19 is a suggestion content illustrating a flow of a process in which a suggestion content determining section of a device operation suggestion notification system in accordance with Embodiment 20 of the present invention determines suggestion content.

The following description will discuss another embodiment of the present invention with reference to FIGS. 18 and 19. Note that, for convenience, members identical in function to those described in the above embodiments will be given the same reference signs, and their descriptions will be omitted.

FIG. 18 is a schematic diagram illustrating an overview of a device operation suggestion notification system 1 in accordance with Embodiment 20 of the present invention. As illustrated in FIG. 18, according to Embodiment 20, an operation target device 10 and a notification device 20 are an air conditioner 10C and a smartphone 20A, respectively. Operation status information to be obtained by a controlling device 30 are (1) information on whether or not the air conditioner 10C is in operation, (2) in a case where the air conditioner 10C is in operation, information on whether a cooling operation is being carried out or a heating operation is being carried out, (3) in the case where the air conditioner 10C is in operation, a temperature setting, and (4) in a case where the air conditioner 10C is not in operation, timer-set time which is set by a timer and at which the air conditioner 10C is set to start its operation. External information to be obtained by the controlling device 30 is weather forecast and estimated return-home time which are obtained from a network 2.

(Details of Process of Determining Suggestion Content)

According to Embodiment 20, suggestion content determined by a suggestion content determining section 33 is classified into (i) first suggestion content to be determined by referring to one of the operation status information (1), (2), and (3) and referring to the weather forecast and (ii) second suggestion content to be determined by referring to the operation status information (1) and (4) and referring to the estimated return-home time. First, the process of determining the first suggestion content will be described below. Note that a timing with which the suggestion content determining section 33 starts the process of determining the suggestion content encompass (1) when the weather forecast is updated and (2) when a predetermined length of time has passed. For example, in a case where (i) the operation status information (1), (2), and (3) obtained by the suggestion content determining section 33 indicate that the air conditioner 10C is running the cooling operation at a set temperature of 25° C. and (ii) the weather forecast which is external information indicates that air temperature is 32° C., there is a large difference between the outside air temperature of 32° C. and the set temperature of 25° C., which large difference will have an adverse impact on the user's body when the user returns home from outside. Therefore, the suggestion content determining section 33 determines that suggestion content suggests increasing the temperature setting of the cooling operation. The suggestion content determining section 33 is thus capable of suggesting a change in temperature setting of the air conditioner 10C in a case where there is a large difference between outside air temperature and a set temperature.

In a case where, as an another example, (i) the operation status information (1) obtained by the suggestion content determining section 33 indicates that the air conditioner 10C is not in operation and (ii) the weather forecast indicates that air temperature is 32° C., the suggestion content determining section 33 determines that suggestion content suggests running the cooling operation of the air conditioner 10C so as to prevent the user from having a heat stroke. In a case where (i) the operation status information (1) indicates that the air conditioner 10C is not in operation and (ii) the weather forecast indicates that air temperature is −3° C., the suggestion content determining section 33 determines that suggestion content suggests running the heating operation of the air conditioner 10C so as to prevent the user from catching a cold. The suggestion content determining section 33 is thus capable of suggesting running the air conditioner 10C in a case where outside air temperature appears to be such a temperature that would adversely affect the condition of the user.

Next, the process of determining the second suggestion content will be described below with reference to FIG. 19. FIG. 19 is a flow chart illustrating a flow of the process in which the suggestion content determining section 33 of the device operation suggestion notification system 1 in accordance with Embodiment 20 of the present invention determines suggestion content.

First, the suggestion content determining section 33 compares estimated return-home time of the user and timer-set time of the air conditioner 10C (Step S20). Then, the suggestion content determining section 33 determines whether or not the timer-set time is earlier than the estimated return-home time (Step S21).

In a case where it is determined in the step S21 that "the timer-set time is earlier than the estimated return-home time" (Step S21: YES), the suggestion content determining section 33 determines whether or not the timer-set time is earlier than the estimated return-home time by 20 minutes or more (Step S22).

In a case where it is determined in the step S22 that "the timer-set time is earlier than the estimated return-home time by 20 minutes or more" (Step S22: YES), the suggestion content determining section 33 determines that suggestion content suggests delaying the timer-set time. This is because, in such a case, the air conditioner 10C will have been running for an extended period of time before the user returns home, and the temperature in the home will be therefore too high or too low by the time when the user returns home.

On the other hand, in a case where it is determined in the step S22 that "the timer-set time is earlier than the estimated return-home time by less than 20 minutes" (Step S22: NO), the suggestion content determining section 33 does not generate suggestion content (Step S24). This is because, in such a case, the air conditioner 10C will have started running by the time when the user returns home, and the temperature in the home will be therefore at a comfortable level.

In a case where it is determined in the step S21 that "the timer-set time is not earlier than the estimated return-home time", the suggestion content determining section 33 determines that suggestion content suggests advancing the timer-set time (Step S25) so as to cause the temperature in the home to be at a comfortable level when the user returns home. This is because the air conditioner 10C will otherwise (i) still not have started running at time when the user returns home or (ii) start running at time when the user returns home.

The suggestion content determining section 33 is thus capable of suggesting a change in timer-set time so that the temperature in the home will be at a comfortable level when the user returns home.

The following description will discuss an example in which external information obtained by the controlling device 30 is electric power consumption information.

In a case where the suggestion content determining section 33 (i) obtains, as external information, electric power consumption information indicating that electric power consumption will reach its peak at 14:00 and (ii) obtains operation status information indicating that the air conditioner 10C is running a cooling operation, the suggestion content determining section 33 determines that suggestion content suggests increasing a temperature setting of the cooling operation by 1 degree so as to reduce electric power consumption. An example of notifying, with a sound, the user of the suggestion content is that the smartphone 20A outputs an artificial voice saying "Today is Monday. Electric power consumption is supposed to reach its peak around 14:00. The temperature setting of the air conditioner will be turned up by 1° C. at 14:00." As another example, the smartphone 20A can output an artificial voice saying "Please turn up the temperature setting by 1° C. to save electricity use."

Thus, by referring to a result of an analysis of electric power consumption information obtained from an external source, the suggestion content determining section 33 determines suggestion content to include a plan for how to control an operation target device. In so doing, instead of making a proactive suggestion such as "the temperature setting of the air conditioner will be turned up by 1° C.", the suggestion can prompt the user's operation such as "Please turn up the temperature setting by 1° C."

The following description will discuss an example in which external information obtained by the controlling device 30 is (i) weather forecast obtained from the network 2 and (ii) advertisement information of a grocery store. Note that the advertisement information of the grocery store can be obtained from the network 2 or obtained via an Email sent from the grocery store.

In a case where the suggestion content determining section 33 obtains (i) weather information indicating that air temperature in the afternoon will exceed 30° C., (ii) advertisement information indicating that the grocery store will have a sale at 15:00, and (iii) operation status information indicating that the air conditioner 10C is running a cooling operation, the suggestion content determining section 33 determines that suggestion content suggests turning off the air conditioner and going to the grocery store for shopping. An example of notifying the user of the suggestion content is that the smartphone 20A outputs an artificial voice saying "The air temperature is supposed to exceed 30° C. this afternoon. Why don't you turn off the air conditioner and go shopping at 15:00 since there will be a sale at XX Mart then?"

The suggestion content determining section 33 can thus determine, by referring to air temperature information and advertisement information from an external source, that suggestion content concerns an operation of an operation target device and an action of the user. In the example above, a reduction in electric power consumption is aided by the suggestion that the user turn off the air conditioner and go out.

The following description will discuss an example in which external information obtained by the controlling device 30 is location information indicative of the location of a friend.

In a case where the suggestion content determining section 33 obtains (i) location information indicating that the user's friends are gathering at a coffee shop and (ii) operation status information indicating that the air conditioner 10C is running a cooling operation, the suggestion content determining section 33 determines that suggestion content suggests turning off the air conditioner and going to the coffee shop. An example of notifying the user of the suggestion content is that the smartphone 20A outputs an artificial voice saying "Mr. A and Mr. B are at XX Café. Why don't you turn off the air conditioner and go to XX Café?" Note that the location information of people can be obtained from a general social network service.

The suggestion content determining section 33 can thus determine, by referring to air temperature information from an external source and to location information of a particular individual(s), that suggestion content (i) concerns an operation of an operation target device and (ii) guides the user to a location where the particular individual(s) is present. In this example also, a reduction in electric power consumption is aided by the suggestion the user turn off the air conditioner and go out.

The following description will discuss an example in which external information obtained by the controlling device 30 is operation history information which is obtained from the network 2 and which indicates an operation history of the air conditioner 10C.

In a case where the suggestion content determining section 33 obtains (i) operation history information indicating that, for the first time in the previous year, the air conditioner 10C ran a cooling operation exactly a year before the current date and (ii) operation status information indicating that the air conditioner 10C is not running the cooling operation, the suggestion content determining section 33 determines that suggestion content suggests a test run of the air conditioner. An example of notifying the user of the suggestion content is that the smartphone 20A outputs an artificial voice saying "The air conditioner was used on June 12 last year. Would you like to try using the air conditioner?"

In a case where the suggestion content determining section 33 obtains weather information in addition to the operation history information, the suggestion content determining section 33 can determine, not based on the calendar but based on the weather information, that suggestion content suggests a test run of the air conditioner. For example, in a case where (i) the air temperature has not exceeded 30° C. this year while the air temperature on the day exactly a year before the current date was exceeding 30° C. and (ii) the weather information thus obtained indicates that the air temperature appears to exceed 30° C. a week from the current date, the suggestion content determining section 33 determines that suggestion content suggests a test run of the air conditioner.

The suggestion content determining section 33 can thus determine, by referring to the past weather information, that suggestion content concerns an operation of an operation target device. Note that the past weather information can be obtained as external information, or weather information stored in the controlling device 30 can be used as the past weather information.

The following description will discuss an example in which external information obtained by the controlling device 30 is electricity charge information which is obtained from the network 2 and which concerns electricity charges. Note that information stored in the controlling device 30 can be used as the electricity charge information.

In a case where the suggestion content determining section 33 obtains (i) external information indicating that electricity charges for the current month seem to be higher than those for the same month in the previous year and (ii) operation status information indicating that the air conditioner 10C is running a cooling operation, the suggestion content determining section 33 determines that suggestion content suggests running the air conditioner 10C in an energy-efficient mode. An example of notifying the user of the suggestion content is that smartphone 20A outputs an artificial voice saying "The electricity charges for June last year were 12,000 yen. The electricity charges for June this year as of June 15 are 7,000 yen. The air conditioner will be running in the energy-efficient mode until the end of June."

Note that whether or not the electricity charges for the current month will be more expensive than those for the same month in the previous year can be determined by, for example, evaluating whether or not the electricity charges have exceeded a threshold value set in advance. For example, whether or not the electricity charges for the current month will be more expensive can be determined by evaluating whether or not electricity charges for the first half of the current month exceeded 60% of the electricity charges for the same month in the previous year.

The suggestion content determining section 33 can thus determine, by referring to the electricity charges up to the current time, that suggestion content includes a plan for how to control an operation target device.

The following description will discuss an example in which external information obtained by the controlling device 30 is electric power consumption information on electricity power consumed at home. Note that the electric power consumption information can be obtained by the controlling device 30 (i) from a management device that individually manages home electrical appliances or (ii) from the individual home electrical appliances that manage their respective electric power consumption.

In a case where the suggestion content determining section 33 obtains (i) electric power consumption information indicating that electric power consumption of the air conditioner 10C is higher than that of other devices and (ii) operation status information indicating that the air conditioner 10C is running a cooling operation, the suggestion content determining section 33 determines that suggestion content suggests running the air conditioner 10C in an energy-efficient mode. As example of notifying the user of the suggestion content is that the smartphone 20A outputs an artificial voice saying "Since the air conditioner is consuming a large amount of electricity, the air conditioner will be running in the energy-efficient mode."

The suggestion content determining section 33 can thus determine, by referring to the electricity charges for the electric power consumption up to the current time, suggestion content includes a plan for how to control an operation target device.

Embodiment 21

Figure 20:
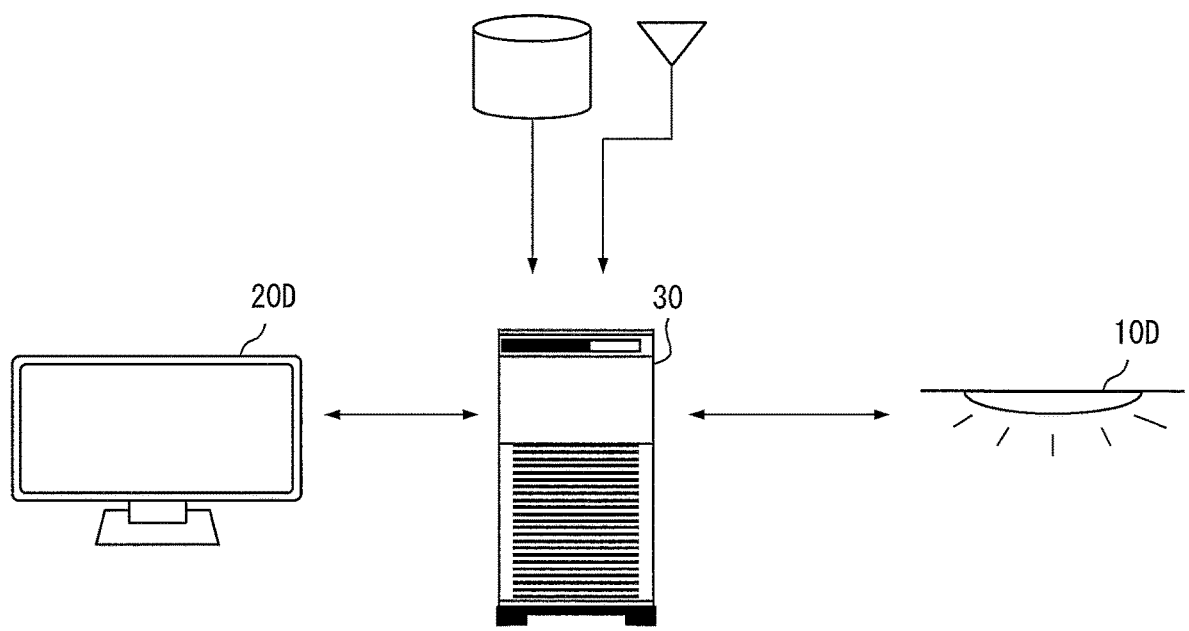
FIG. 20 is a schematic diagram illustrating an overview of a device operation suggestion notification system in accordance with Embodiment 21 of the present invention.

The following description will discuss another embodiment of the present invention with reference to FIG. 20. Note that, for convenience, members identical in function to those described in the above embodiments will be given the same reference signs, and their descriptions will be omitted.

FIG. 20 is a schematic diagram illustrating an overview of a device operation suggestion notification system 1 in accordance with Embodiment 21 of the present invention. As illustrated in FIG. 20, according to Embodiment 21, an operation target device 10 and a notification device 20 are an LED light 10D and a television 20D, respectively. According to Embodiment 21, operation status information obtained by a controlling device 30 indicates whether or not the LED light 10D is turned on. External information obtained by the controlling device 30 are (i) program information which is obtained from the television 20D and which concerns a program being viewed and (ii) an electronic program table obtained from a network 2 or from an antenna 3.

(Details of Process of Determining Suggestion Content)

Next, the process in which a suggestion content determining section 33 of Embodiment 21 determines suggestion content will be described below. Note that examples of a timing with which the suggestion content determining section 33 starts the process encompass (1) when viewing of a program is scheduled, (2) when a program starts, (3) when a user changes a channel, and (4) when a predetermined length of time has passed.

The suggestion content determining section 33 determines, based on the program information and the electronic program table, whether or not a genre of a program being viewed by the user is movie. In a case where the genre of the program is movie, the suggestion content determining section 33 determines that suggestion content suggests darkening the brightness of the LED light 10D so that the user can better concentrate on the movie while viewing it. The suggestion content determining section 33 is thus capable of suggesting a change in brightness of the LED light 10D by referring to (i) a genre of a program being viewed by the user and (ii) brightness of the LED light 10D.

According to Embodiment 21, the notification controlling section 35 selects the television 20D as a notification device 20 by determining that (i) the television 20D is being viewed and (ii) the user is located in the vicinity of the television 20D.

Embodiment 22

Control blocks of the controlling device 30 and of the notification device 20 (particularly, the operation status information obtaining section 32, the suggestion content determining section 33, the external information obtaining section 34, the notification controlling section 35, the notifying section 22, and the input section 23) may be realized by a logic circuit (hardware) provided in an integrated circuit (IC chip) or the like or may be realized by software as executed by a CPU (Central Processing Unit).

In the latter case, the controlling device 30 and the notification device 20 each include: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

SUMMARY

A controlling device (110) in accordance with Aspect 1 of the present invention includes: controlling units (first controlling section 112*a*, second controlling section 112*b*, third controlling sections 112*c*, fourth controlling section 112*d*, . . . , Nth controlling section 112*n*) configured to control respective of a plurality of devices; and a master controlling unit (113) configured to determine, by referring to information obtained from one of the plurality of devices, a control matter concerning how to control another one of the plurality of devices.

With the configuration, the controlling device can control, by referring to information obtained from one of a plurality of devices, another one of the plurality of devices. This allows the controlling device to (i) control a device more properly for a user than is the cases of a conventional technology and (ii) control a plurality of devices in closer relation to one another than is the case of a conventional technology.

The controlling device in accordance with Aspect 2 of the present invention can be configured in Aspect 1 such that the master controlling unit controls, by referring to the control matter, the another one of the plurality of devices to give a notification.

With the configuration, the controlling device can control the another one of the plurality of devices to notify the user of the control matter which has been determined by referring to the information obtained from the one of the plurality of devices. This allows the controlling device to notify the user of a suggestion in view of the information obtained from the one of the plurality of devices.

The controlling device in accordance with Aspect 3 of the present invention can be configured in Aspect 2 such that the master controlling unit causes the notification to be given with a voice.

With the configuration, the controlling device can give a notification to a user with a voice. This allows the controlling device to cause the personification of a controlled device.

The controlling device in accordance with Aspect 4 of the present invention can be configured in Aspect 2 such that: the another one of the plurality of devices (bulletin board server 600) manages an electronic bulletin board; and the master controlling device causes the notification to be given by controlling the another one of the plurality of devices to cause the electronic bulletin board to display notification content.

With the configuration, the controlling device can control the electronic bulletin board to display suggestion content of which the another one of the plurality of devices notifies the user. This allows even a user, who is not located in the vicinity of the controlled device, to be notified of the suggestion content by looking at the electronic bulletin board.

The controlling device in accordance with Aspect 5 of the present invention can be configured in any one of Aspects 1 through 4 such that the master controlling unit controls the one of the plurality of devices in accordance with an instruction of a user, which instruction is given with a voice and obtained by the another one of the plurality of devices.

With the configuration, the controlling device can control the controlled device in accordance with an instruction of the user, which is given with a voice. This allows the controlling device to cause the personification of the controlled device.

A controlled device in accordance with Aspect 6 of the present invention is controlled in accordance with an instruction of a controlling device, which instruction is determined by referring to information obtained from another controlled device managed by the controlling device.

With the configuration, the controlled device (solar power generating device 200, air conditioner 300, refrigerator 400, washing machine 500, and bulletin board server 600) is controlled in accordance with an instruction which has been determined by referring to information obtained from another controlled device. This allows a controlled device, which can be controlled by the controlling device, to be realized.

The controlled device in accordance with Aspect 7 of the present invention can be configured in Aspect 6 such that a notification is given in accordance with the instruction.

With the configuration, the controlled device can notify the user of an instruction which has been determined by referring to the information obtained from another controlled device. This allows the controlled device to notify the user of a suggestion in accordance with information obtained from any given device.

A controlling method in accordance with Aspect 8 of the present invention includes: a master controlling step of determining, by referring to information obtained from one of a plurality of devices, a control matter concerning how to control another one of the plurality of devices; and a controlling step of controlling the another one of the plurality of devices in accordance with the control matter determined in the master controlling step.

With the configuration, it is possible to produce an effect similar to that produced by the controlling device in accordance with Aspect 1.

A controlling system in accordance with Aspect 9 of the present invention is a controlling system (101) includes: a controlling device (110); and a plurality of controlled devices (solar power generating device 200, air conditioner 300, refrigerator 400, washing machine 500, and bulletin board server 600) to be controlled in accordance with an instruction from the controlling device, said controlling device including controlling units (first controlling section 112*a*, second controlling section 112*b*, third controlling sections 112*c*, fourth controlling section 112*d*, . . . , Nth controlling section 112*n*) configured to control respective of a plurality of controlled devices and a master controlling unit (113) configured to determine, by referring to information obtained from one of the plurality of controlled devices, a control matter concerning how to control another one of the plurality of controlled devices, the another one of the plurality of controlled devices giving a notification in accordance with the instruction.

With the configuration, it is possible to realize a controlling system including (i) the controlling device of Aspect 1 and (ii) the controlled device of Aspect 7.

The controlling device and the controlled devices in accordance with each aspect of the present invention can be realized by use of a computer. In such a case, the scope of the present invention also encompasses (i) a program that realizes the controlling device by causing the computer to serve as each unit included in the controlling device and (ii) a computer-readable storage medium in which the program is stored.

A controlling device (30) in accordance with Aspect 10 of the present invention includes: an operation status information obtaining unit (operation status information obtaining section 32) configured obtain, from a first device (operation target device 10), operation status information indicative of an operation status of the first device; an external information obtaining unit (external information obtaining section 34) configured to obtain external information; a suggestion content determining unit (suggestion content determining section 33) configured to determine, by referring to the operation status information and the external information, suggestion content concerning the first device; and a notification controlling unit (notification controlling section 35) configured to cause a second device to give a notification of the suggestion content.

With the configuration, the controlling device can (i) determine, by referring to the operation status information indicative of the operation status of the first device and to the external information, the suggestion content concerning the operation of the first device and (ii) cause the second device to notify the user of the suggestion content. This allows the controlling device to (a) make a suggestion concerning an action of a user, which suggestion is more appropriate to the status of a device or given information than is the case of a conventional technology and (b) make a suggestion concerning an operation of a device, which suggestion is more appropriate than is the case of a conventional technology.

The controlling device in accordance with Aspect 11 of the present invention can be configured in Aspect 10 such that the second device is a device located in the vicinity of a user.

With the configuration, the controlling device can cause the second device, which is located in the vicinity of the user, to notify the user of the suggestion content. This makes it possible to properly notify the user that there is a suggestion.

The controlling device in accordance with Aspect 12 of the present invention can, in Aspect 11, further includes an obtaining unit configured to obtain information indicative of whether or not the user is present in the vicinity of the second device.

With the configuration, the controlling device can cause the second device, which is located in the vicinity of the user, to notify the user of the suggestion content. This makes it possible to properly notify the user that there is a suggestion.

The controlling device in accordance with Aspect 13 of the present invention can be configured in Aspect 12 such that, in a case where the second device is being operated, the second device supplies, to the controlling device, information indicating that the user is present in the vicinity of the second device.

With the configuration, the controlling device can cause a device, which is being operated by the user, to give a notification of the suggestion content as the second device. This makes it possible to properly notify the user that there is a suggestion.

The controlling device in accordance with Aspect 14 of the present invention can be configured in Aspect 10 such that the second device is a device located in the vicinity of a user.

With the configuration, the controlling device can cause the second device, which is turned on, to notify the user of the suggestion content. This makes it possible to properly notify the user that there is a suggestion.

The controlling device in accordance with Aspect 15 of the present invention can be configured in any one of Aspects 10 through 12 such that the second device is a mobile device.

With the configuration, the controlling device can cause a mobile device to notify the user of the suggestion content. This makes it possible to properly notify the user that there is a suggestion.

A controlling method in accordance with Aspect 16 of the present invention includes: an operation status information obtaining step of obtaining, from a first device, operation status information indicative of an operation status of the first device; an external information obtaining step of obtaining external information; a suggestion content determining step of determining, by referring to the operation status information and the external information, suggestion content concerning the first device; and a notification controlling step of causing a second device to give a notification of the suggestion content.

With the configuration, it is possible to produce an effect similar to that produced by the controlling device of Aspect 10.

A controlling system in accordance with Aspect 17 of the present invention includes: a controlling device; and a second device; said controlling device including an operation status information obtaining unit configured to obtain, from a first device, operation status information indicative of an operation status of the first device, an external information obtaining unit configured to obtain external information, a suggestion content determining unit configured to determine, by referring to the operation status information and the external information, suggestion content concerning the first device, and a notification controlling unit configured to cause the second device to give a notification of the suggestion content, said second device including a notifying unit configured to give the notification of the suggestion content.

With the configuration, it is possible to realize a system capable of making a suggestion concerning an operation of a device, which suggestion is more appropriate than is the case of a conventional technology.

A notification device (20) in accordance with Aspect 18 of the present invention includes: a suggestion content receiving unit (notification device communicating section 21) configured to receive, from a controlling device (30), suggestion content which concerns an operation of another device (operation target device 10) and which is determined by referring to (i) operation status information indicative of an operation status of the another device and (ii) information; a notifying unit (notifying section 22) configured to give a notification of the suggestion content; and an operation receiving unit (input section 23) configured to receive an operation of a user, which operation indicates whether or not the user accepts the suggestion content.

With the configuration, it is possible to realize a notification device capable of making a suggestion concerning an operation of a device, which suggestion is more appropriate than is the case of a conventional technology.

The controlling device and the notification device in accordance with each aspect of the present invention can be realized by use of a computer. In such a case, the scope of the present invention also encompasses (i) a program that realizes each of the controlling device and the notification device by causing the computer to serve as each unit included in each of the controlling device and the notification device and (ii) a computer-readable storage medium in which the program is stored.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

The present invention can be used for electrical appliances installed in general households, and for a system and a controlling device that control the electrical appliances.

REFERENCE SIGNS LIST

1 Device operation suggestion notification system
2 Network
3 Antenna
10 Operation target device (first device)
11 Device communicating section
12 Operation status obtaining section
13 Operation status changing section
20 Notification device (second device)
21 Notification device communicating section (suggestion content receiving unit)
22 Notifying section (notifying unit)
23 Input section (operation receiving unit)
30 Controlling device
31 Communicating section
32 Operation status information obtaining section (operation status information obtaining unit)
33 Suggestion content determining section (suggestion content determining unit)
34 External information obtaining section (external information obtaining unit)
35 Notification controlling section (notification controlling unit)
101 Device controlling system
110 Controlling device
111 Communicating section
112 Controlling section (controlling unit)
113 Master controlling section (master controlling unit)
200 Solar power generating device (controlled device)
210 Solar power generating device communicating section
220, 320, 420, 520, 620 Controlling section
230, 330, 430, 530 Sensor section
300 Air conditioner (controlled device)
310 Air conditioner communicating section
400 Refrigerator (controlled device)
410 Refrigerator communicating section
500 Washing machine (controlled device)
510 Washing machine communicating section
600 Bulletin board server (controlled device)
610 Bulletin board server communicating section
630 Input section

The invention claimed is:

1. A controlling device comprising:
one or more processors,
the one or more processors being configured to
control a plurality of devices, among which a first device and a plurality of second devices are included, each of the plurality of devices not being the controlling device, two or more of the plurality of second devices being of respective different kinds and having respective different functions, and
determine pieces of second information by referring to first information obtained from the first device, the pieces of second information corresponding to the respective plurality of second devices and concerning how to control the respective functions of the plurality of second devices, which functions are related to the first information, so as to control each of the plurality of second devices to give a notification of a corresponding one of the pieces of second information,
the two or more of the plurality of second devices respectively corresponding to two or more of the pieces of second information, and
the two or more of the pieces of second information differing from each other.

2. The controlling device as set forth in claim 1, wherein the one or more processors cause the notification to be given with a voice.

3. The controlling device as set forth in claim 1, wherein the one or more processors control the another one of the plurality of devices in accordance with an instruction of a user, which instruction is (i) given with a voice in response to the second information in the notification and (ii) obtained by the another one of the plurality of devices.

4. A controlled device to be controlled in accordance with an instruction of a controlling device which controls a plurality of devices, among which is a first device and a plurality of second devices, each of the plurality of devices not being the controlling device, the plurality of second devices having respective functions, which instruction is determined by determining pieces of second information by referring to first information obtained from the first device managed by the controlling device, the pieces of second information concerning how to control the respective functions of the plurality of second devices,
each of the plurality of second devices being configured to give, in accordance with the instruction, a notification of a corresponding one of the pieces of second information concerning how to control a function of the corresponding second device, which function is related to the first information.

5. A controlling method for controlling a plurality of devices, among which a first device and a plurality of second devices are included, each of the plurality of devices not being a controlling device, two or more of the plurality of second devices being of respective different kinds and having respective different functions comprising:
a master controlling step of the controlling device determining pieces of second information by referring to first information obtained from the first device, the pieces of second information corresponding to the respective plurality of second devices and concerning how to control the respective functions of the plurality of second devices, which functions are related to the first information, so as to control each of the plurality of second devices to give a notification of a corresponding one of the pieces of second information, the two or more of the plurality of second devices respectively corresponding to two or more of the pieces of second information, and the two or more of the pieces of second information differing from each other; and a controlling step of controlling one of the plurality of second devices in accordance with the second information determined in the master controlling step.

6. A computer-readable non-transitory storage medium that stores a program for controlling a computer to serve as a controlling device including one or more processors, the program controlling the one or more processors to carry out a process of controlling a plurality of devices, among which a first device and a plurality of second devices are included, each of the plurality of devices not being the controlling device, two or more of the plurality of second devices being of respective different kinds and having respective different functions, carry out a process of determining pieces of second information, by referring to first information obtained from the first device, the pieces of second information corresponding to the respective plurality of second devices and concerning how to control the respective functions of the plurality of second devices, which functions are related to the first information, so as to control each of the plurality of second devices to give a notification of a corresponding one of the pieces of second information, the two or more of the plurality of second devices respectively corresponding to two or more of the pieces of second information, and the two or more of the pieces of second information differing from each other.

7. A controlling system comprising:

a controlling device; and a plurality of controlled devices, among which a first device and a plurality of second devices are included, each of the plurality of devices not being the controlling device, two or more of the plurality of second devices being of respective different kinds and having respective different functions, to be controlled in accordance with an instruction from the controlling device, said controlling device including one or more processors, the one or more processors being configured to control the plurality of controlled devices, and determine pieces of second information by referring to first information obtained from the first device, the pieces of second information corresponding to the respective plurality of second devices and concerning how to control the respective functions of the plurality of second devices, which functions are related to the first information, so as to control each of the plurality of second devices to give a notification of a corresponding one of the pieces of second information, the two or more of the plurality of second devices respectively corresponding to two or more of the pieces of second information, and the two or more of the pieces of second information differing from each other, one of the plurality of second devices giving the notification of the corresponding piece of the second information in accordance with the instruction from the controlling device.

8. A computer-readable non-transitory storage medium that stores a program for controlling a computer to serve as a controlled device to be controlled in accordance with an instruction from a controlling device which controls a plurality of devices, among which is a first device and a plurality of second devices, each of the plurality of devices not being the controlling device, two or more of the plurality of second devices being of respective different kinds and having respective different functions, the controlled device including one or more processors, the instruction being determined by determining pieces of second information by referring to first information obtained from the first device, the pieces of second information corresponding to the respective plurality of second devices and concerning how to control the respective functions of the plurality of second devices, the two or more of the plurality of second devices respectively corresponding to two or more of the pieces of second information, and the two or more of the pieces of second information differing from each other, and the program controlling the one or more processors to carry out a process of giving a notification of a corresponding one of the pieces of second information in accordance with the instruction.

9. A controlling device comprising:

one or more processors, the one or more processors being configured to obtain, from a first device, operation status information indicative of an operation status of the first device, obtain external information which includes advertisement information or temperature information, determine, by referring to the operation status information and the external information, suggestion content concerning a use of one or more functions of the first device, and control a second device to give a notification of the suggestion content, the second device not being the controlling device, wherein an instruction to run the one or more functions can be inputted on the second device by a user and then transmitted to the controlling device in response to the notification of the suggested content.

10. The controlling device as set forth in claim 9, wherein the one or more processors cause the second device, which is located within a range where the notification of the suggestion content can be given to a user, to give the notification of the suggestion content.

11. The controlling device as set forth in claim 10, wherein: the one or more processors further obtain information indicative of whether or not the user is present in the vicinity of the second device.

12. The controlling device as set forth in claim 11, wherein, in a case where the second device is being operated, the second device supplies, to the controlling device, information indicating that the user is present in the vicinity of the second device.

13. The controlling device as set forth in claim 9, wherein the one or more processors cause the second device, which is turned on, to give the notification of the suggestion content.

14. The controlling device as set forth in claim 9, wherein the second device is a mobile device.

15. A controlling method comprising:
an operation status information obtaining step of obtaining, from a first device, operation status information indicative of an operation status of the first device;
an external information obtaining step of obtaining external information which is advertisement information or temperature information;
a suggestion content determining step of determining, by referring to the operation status information and the external information, suggestion content concerning a use of one or more functions of the first device; and
a notification controlling step of controlling a second device to give a notification of the suggestion content, the second device not being a controlling device,
wherein an instruction to run the one or more functions can be inputted on the second device by a user and then transmitted to the controlling device in response to the notification of the suggested content.

16. A controlling system comprising:
a controlling device; and
a second device;
said controlling device including one or more processors of the controlling device,
the one or more processors of the controlling device being configured to
obtain, from a first device, operation status information indicative of an operation status of the first device,
obtain external information which is advertisement information or temperature information,
determine, by referring to the operation status information and the external information, suggestion content concerning a use of one or more functions of the first device, and
controlling the second device to give a notification of the suggestion content,
said second device including one or more processors of the second device,
the one or more processors of the second device being configured to
give the notification of the suggestion content, the second device not being the controlling device,
wherein an instruction to run the one or more functions can be inputted on the second device by a user and then transmitted to the controlling device in response to the notification of the suggested content.

17. A computer-readable non-transitory storage medium that stores a program for controlling a computer to serve as a controlling device including one or more processors,
the one or more processors being configured to
carry out a process of obtaining, from a first device, operation status information indicative of an operation status of the first device,
carry out a process of obtaining external information which is advertisement information or temperature information,
carry out a process of determining, by referring to the operation status information and the external information, suggestion content concerning a use of one or more functions of the first device, and
carry out a process of controlling a second device to give a notification of the suggestion content, the second device not being the controlling device,
wherein an instruction to run the one or more functions can be inputted on the second device by a user and then transmitted to the controlling device in response to the notification of the suggested content.

18. A notification device comprising:
one or more processors,
the one or more processors being configured to
receive, from a controlling device, suggestion content which concerns a use of one or more functions of another device and which is determined by referring to (i) operation status information indicative of an operation status of the another device and (ii) external information which is advertisement information or temperature information,
give a notification of the suggestion content in accordance with an instruction from the controlling device, and
receive a user's operation indicative of whether or not the user accepts the suggestion content, the another device not being the controlling device,
wherein an instruction to run the one or more functions can be inputted on the second device by a user and then transmitted to the controlling device in response to the notification of the suggested content.

19. A computer-readable non-transitory storage medium that stores a program for controlling a computer to serve as a notification device including one or more processors,
the program causing the one or more processors to
carry out a process of receiving suggestion content which concerns a use of one or more functions of another device and which is determined by referring to (i) operation status information indicative of an operation status of the another device and (ii) external information which is advertisement information or temperature information,
carry out a process of giving a notification of the suggestion content, and
carry out a process of receiving a user's operation indicative of whether or not the user accepts the suggestion content, the second device not being the controlling device,
wherein an instruction to run the one or more functions can be inputted on the second device by a user and then transmitted to the controlling device in response to the notification of the suggested content.

20. The controlling device as set forth in claim 1, wherein the second information contains information for allowing a user to identify the one of the plurality of devices.

21. The controlling device as set forth in claim 1, wherein the first information contains information which the one of the plurality of devices receives from an external source.

* * * * *